United States Patent
Yamori

(10) Patent No.: US 9,210,448 B2
(45) Date of Patent: Dec. 8, 2015

(54) MOVING PICTURE DECODING DEVICE, MOVING PICTURE DECODING METHOD AND INTEGRATED CIRCUIT

(75) Inventor: Akihiro Yamori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 803 days.

(21) Appl. No.: 13/220,965

(22) Filed: Aug. 30, 2011

(65) Prior Publication Data

US 2012/0069902 A1   Mar. 22, 2012

(30) Foreign Application Priority Data

Sep. 22, 2010   (JP) .................................. 2010-212711

(51) Int. Cl.
  *H04N 7/26* (2006.01)
  *H04N 19/895* (2014.01)
  *H04N 19/597* (2014.01)
  *H04N 19/44* (2014.01)

(52) U.S. Cl.
  CPC ............. *H04N 19/895* (2014.11); *H04N 19/44* (2014.11); *H04N 19/597* (2014.11)

(58) Field of Classification Search
  CPC .................. H04N 19/00533; H04N 19/00769; H04N 19/00939
  See application file for complete search history.

(56) References Cited

U.S. PATENT DOCUMENTS

| | | | |
|---|---|---|---|
| 2005/0089098 A1* | 4/2005 | Sato et al. ................ | 375/240.16 |
| 2008/0089405 A1* | 4/2008 | Cho et al. ................. | 375/240.01 |
| 2009/0168874 A1* | 7/2009 | Su et al. .................... | 375/240.12 |
| 2010/0119157 A1* | 5/2010 | Kameyama ................... | 382/195 |
| 2010/0150248 A1* | 6/2010 | Pandit et al. ............. | 375/240.25 |
| 2011/0280318 A1 | 11/2011 | Yado et al. | |

FOREIGN PATENT DOCUMENTS

| | | |
|---|---|---|
| JP | 2006-203598 | 8/2006 |
| JP | 2007-325206 | 12/2007 |
| JP | 2011-119803 | 6/2011 |

* cited by examiner

*Primary Examiner* — Dave Czekaj
*Assistant Examiner* — Md Haque
(74) *Attorney, Agent, or Firm* — Staas & Halsey LLP

(57) ABSTRACT

An moving picture decoding device includes a receiver that receives data that has been coded according to multi-view coding of pictures that are included in a moving picture and provided for a plurality of views; a first decoder that decodes coded data that is included in the data coded according to the multi-view coding and provided for a first view; and a second decoder that decodes coded data that is included in the data coded according to the multi-view coding and provided for a second view A detector detects a region of the data that cannot be decoded and is among a plurality of regions to be decoded by the first decoder. A concealing unit conceals the predetermined region detected by the detector using decoded data.

12 Claims, 18 Drawing Sheets

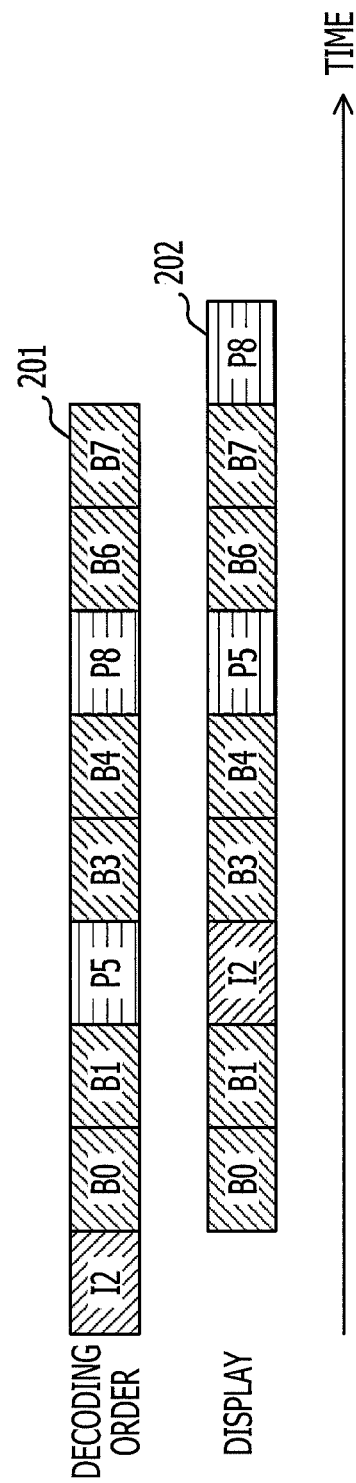

MOVING PICTURE DECODING DEVICE, MOVING PICTURE DECODING METHOD AND INTEGRATED CIRCUIT

CROSS-REFERENCE TO RELATED APPLICATIONS

This application is based upon and claims the benefit of priority of the prior Japanese Patent Application No. 2010-212711, filed on Sep. 22, 2010, the entire contents of which are incorporated herein by reference.

FIELD

Embodiments relate to a moving picture decoding device, a moving picture decoding method and an integrated circuit, which allow coded data of a moving picture to be decoded.

BACKGROUND

In recent years, an environment for viewing and recording a three-dimensional video using a consumer device is being developed. Especially, Blu-ray Disc Association (BDA) has determined a standard for a three-dimensional image format. A market of devices (such as TVs and mobile phones) that support three-dimensional video has started to grow. It is expected that digital broadcasting of three-dimensional (3D) video will be widely available in the near future.

In the broadcasting of three-dimensional video or transmission of three-dimensional video, a broadcast wave may not be appropriately received due to low signal strength in a transmission network. When a transmission error (such as an error indicating that a broadcast wave cannot be appropriately received) occurs, video data or audio data cannot be accurately decoded. In order to encode an image, a temporal-directional prediction is performed. Thus, when a picture in which an error occurs is a picture (such as an I picture or a P picture) that is referenced for prediction of another picture, information of the error is referenced, and the error is transferred to multiple frames. When the error is transferred to the multiple frames, a range that is affected by the error is increased.

To avoid the transfer of the error, there is a technique for concealing the error (occurring in the error picture or an error region of the picture) using an accurately decoded picture or a predetermined region of the accurately decoded picture.

For example, Japanese Laid-open Patent Publication No. 2006-203598 discloses a technique for performing a panning detection and for, when an error occurs, setting a motion vector for a motion compensation and for a block (error block) in which the error occurs on the basis of a motion vector of a macro-block (MB) located near the error block.

In addition, Japanese Laid-open Patent Publication No. 2007-325206 discloses a technique for determining the validity of a macro-block located near a macro-block to be restored, acquiring context information for image restoration from the macro-block determined to be valid, and calculating an estimated motion vector to be used for the restoration.

SUMMARY

In accordance with an aspect of the embodiments, an moving picture decoding device includes, an receiving unit that receives data that has been coded according to multi-view coding and includes data obtained by coding, on a predetermined region basis, pictures that are included in a moving picture and provided for a plurality of views; a first decoder that decodes, on a predetermined region basis, coded data that is included in the data coded according to the multi-view coding and provided for a first view; a second decoder that decodes, on a predetermined region basis, coded data that is included in the data coded according to the multi-view coding and provided for a second view; a detector that detects a predetermined region that cannot be decoded and is among a plurality of predetermined regions to be decoded by the first decoder; and a concealing unit that conceals the predetermined region detected by the detector using decoded data.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIGS. 5A and 5B are diagrams illustrating an example of decoding processes that are performed in a first embodiment.

DETAILED DESCRIPTION OF EMBODIMENT(S)

Figure 1:
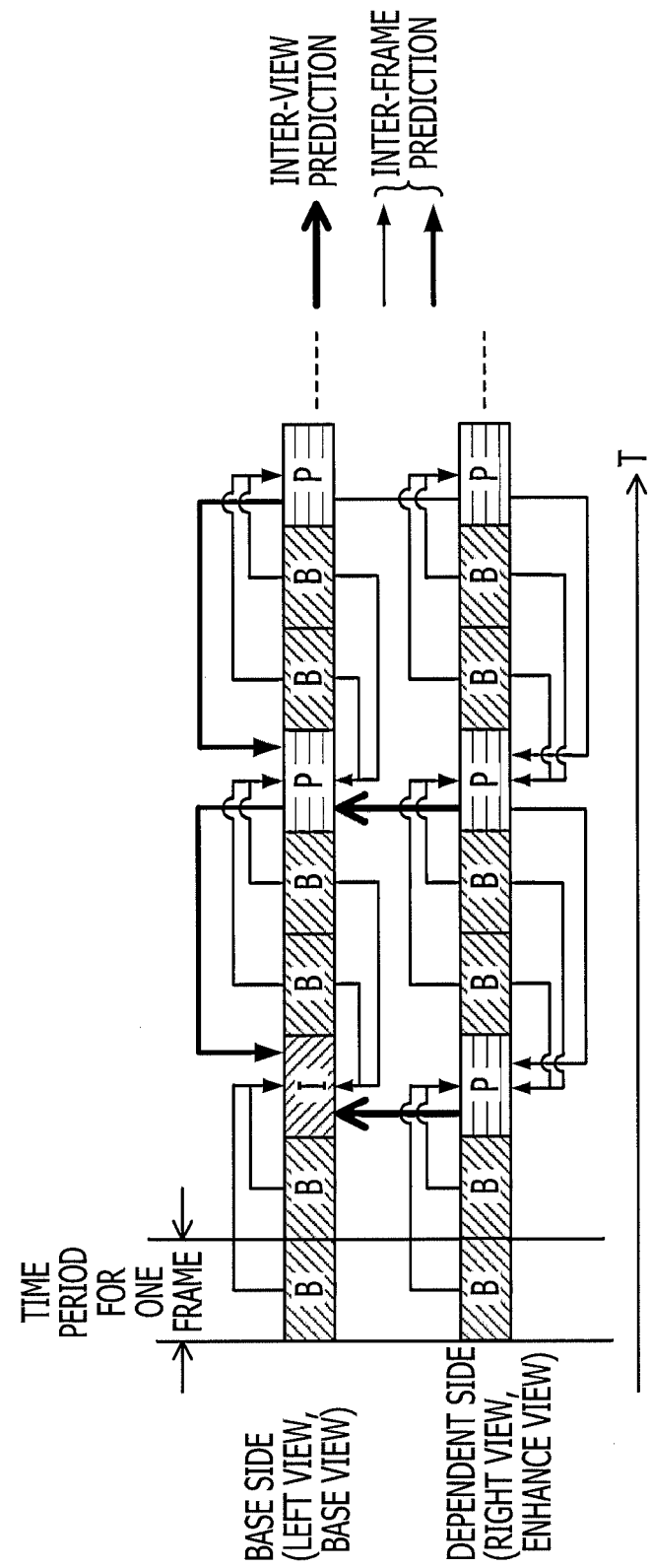
FIG. 1 is a diagram illustrating an example of the relationship between images that are provided for views and for which other images are referenced and the other images that are provided for the views and referenced.

When multi-view video coding (MVC) such as a stereo profile of ITU-T H.264 (ITU-T: International Telecommunication Union Telecommunication Standardization Sector)/ISO/IEC MPEG-4 AVC (ISO/IEC: International Organization for Standardization/International Electrotechnical Commission) is used, images that are provided for multiple views and for which other images are referenced exist, and the other images that are provided for the multiple views and referenced have a relationship as illustrated in FIG. 1. FIG. 1 is a diagram illustrating the relationship between images that are provided for views and for which other images are referenced and the other images that are provided for the views and referenced. In the example illustrated in FIG. 1, a left-eye view (left view) is defined as a base view, while a right-eye view (right view) is defined as an enhanced view or a non-base view. In the following description, the base view is also called a base side, while the enhanced view or the non-base view is also called a dependent side. As illustrated in FIG. 1, frames for the base side can be referenced for frames for the dependent side. A prediction using correlations between frames for the views is called an inter-view prediction. In the example illustrated in FIG. 1, an I frame for the base side or a P frame for the base side is referenced for prediction of a P frame for the dependent side. However, the prediction is not limited to this. For example, a B frame for the base side may be referenced for prediction of a B frame for the dependent side.

The present inventor newly found that there was the following problem. It is considered that each of the aforementioned conventional techniques is used to perform an error concealment process for each of views in order to decode a multi-view image. When the error concealment process is performed using only information on the same view, and an error occurs in several pictures, the error cannot be appropriately concealed.

In addition, as illustrated in FIG. 1, when a correlation between frames for multiple views is used in order to encode a multi-view image, and an error occurs in a frame for the base side during decoding, the error is transferred to a frame for the dependent side, and cannot be appropriated concealed. In addition, an error concealment process for the multi-view video coding technique has not been studied hard. Even when a conventional error concealment process is used, there is a problem that error resistance is not high.

Next, embodiments are described with reference to the accompanying drawings.

First, amounts of information generated for each of views in multi-view video coding are considered. In the following description, multiple views are two views, a right view and a left view, as an example. However, the multiple views may be three or more views. Regarding amounts of information generated in multi-view video coding, larger amounts of information are applied to pictures (such as I pictures and P pictures) that may be referenced, compared to amounts of information to be applied to pictures (such as B pictures) that are not referenced, in general. It is considered that when the amount of information is large, the possibility that an error occurs is high. For example, a B picture may be referenced in H.264, depending on the coding method.

As illustrated in FIG. 1, in order to perform multi-view video coding for two eyes (two views), a base image that may be normally independently reproduced, and a dependent image that is basically to be subjected to differential encoding on the basis of the base image, are coded for the two views. Regarding amounts of generated information, the amount of information applied to the base image is larger than the amount of information applied to the dependent image, as illustrated in FIGS. 2A and 2B.

Figure 2A:
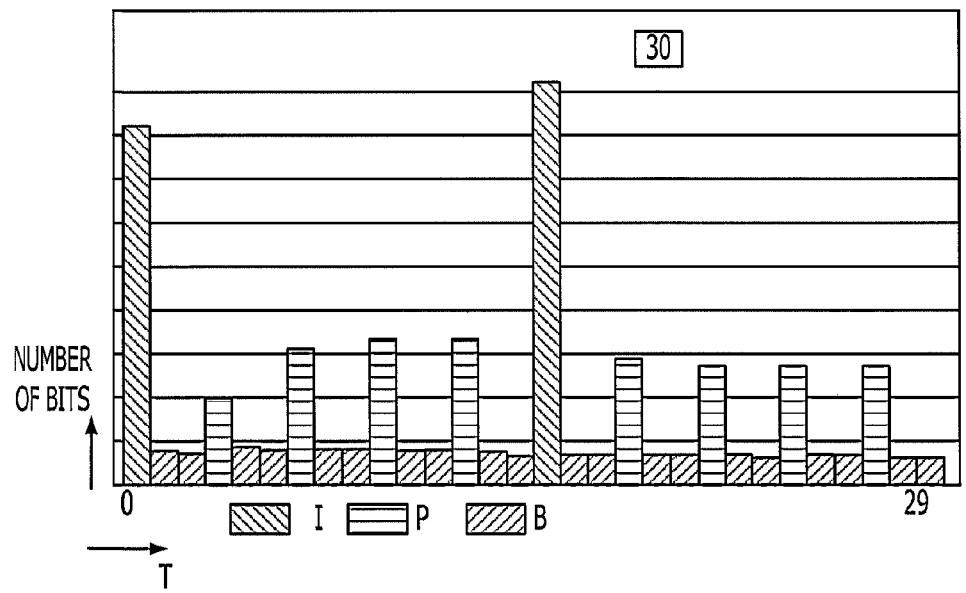
FIGS. 2A and 2B are diagrams illustrating an example of amounts of information generated in multi-view video coding.
Figure 2B:
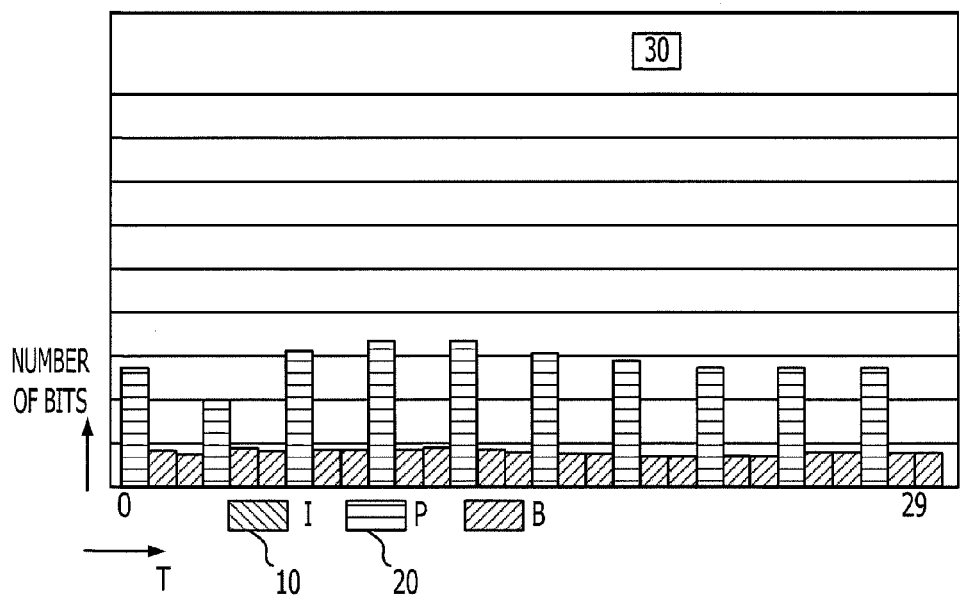

FIGS. 2A and 2B are diagrams illustrating an example of amounts of information generated in the multi-view video coding. The example illustrated in FIGS. 2A and 2B indicates the amounts of the generated information of pictures obtained by performing frame coding on a HDTV video (1280×720, 30 fps) to encode the HDTV video for two views at 12 Mbps. In addition, the example illustrated in FIGS. 2A and 2B indicates that 30 pictures are extracted at a certain time. FIG. 2A illustrates the amounts of the generated information of the pictures for the base side, while FIG. 2B illustrates the amounts of the generated information of the pictures for the dependent side.

As illustrated in FIGS. 2A and 2B, in coding of pictures for the dependent side, pictures 10 that correspond to I pictures of a base image may be subjected to differential encoding that is performed on the basis of the pictures for the base side. Thus, the amounts of generated information of the pictures 10 correspond to the amounts of information of P pictures for the base side. In addition, pictures 20 for the dependent side, which correspond to the P pictures for the base side, may be obtained by a unidirectional prediction performed on pictures for the dependent side and a unidirectional prediction performed on pictures for the base side. Thus, the amounts of generated information of the pictures 20 may be reduced to values that are close to the amounts of information of B pictures for the base side.

As illustrated in FIGS. 2A and 2B, since the amount of the generated information of the pictures for the dependent side is smaller than the amount of the generated information of the pictures for the base side, the possibility that an error occurs in the image for the dependent side is lower than the possibility that an error occurs in the image for the base side. In addition, it may be said that the possibility that coded data of the pictures that are provided for the dependent side and in which an error is considered to occur at a low rate may be accurately decoded is higher than the possibility that coded data of the pictures for the base side may be accurately decoded. Thus, when a decoded picture for the dependent side is used for the error concealment process, the error concealment process may be performed without depending on an error that occurs in a picture for the base side. In a first embodiment, even when an error occurs in a certain region of a picture for the base side, a region that is similar to the certain region and included in a decoded picture for the dependent side is estimated. Then, the region in which the error occurs is concealed using data of the estimated region.

A picture that is included in coded moving picture data to be decoded may be a field to be obtained by an interlace scheme or may be a frame to be obtained by a progressive scheme.

Figure 3:
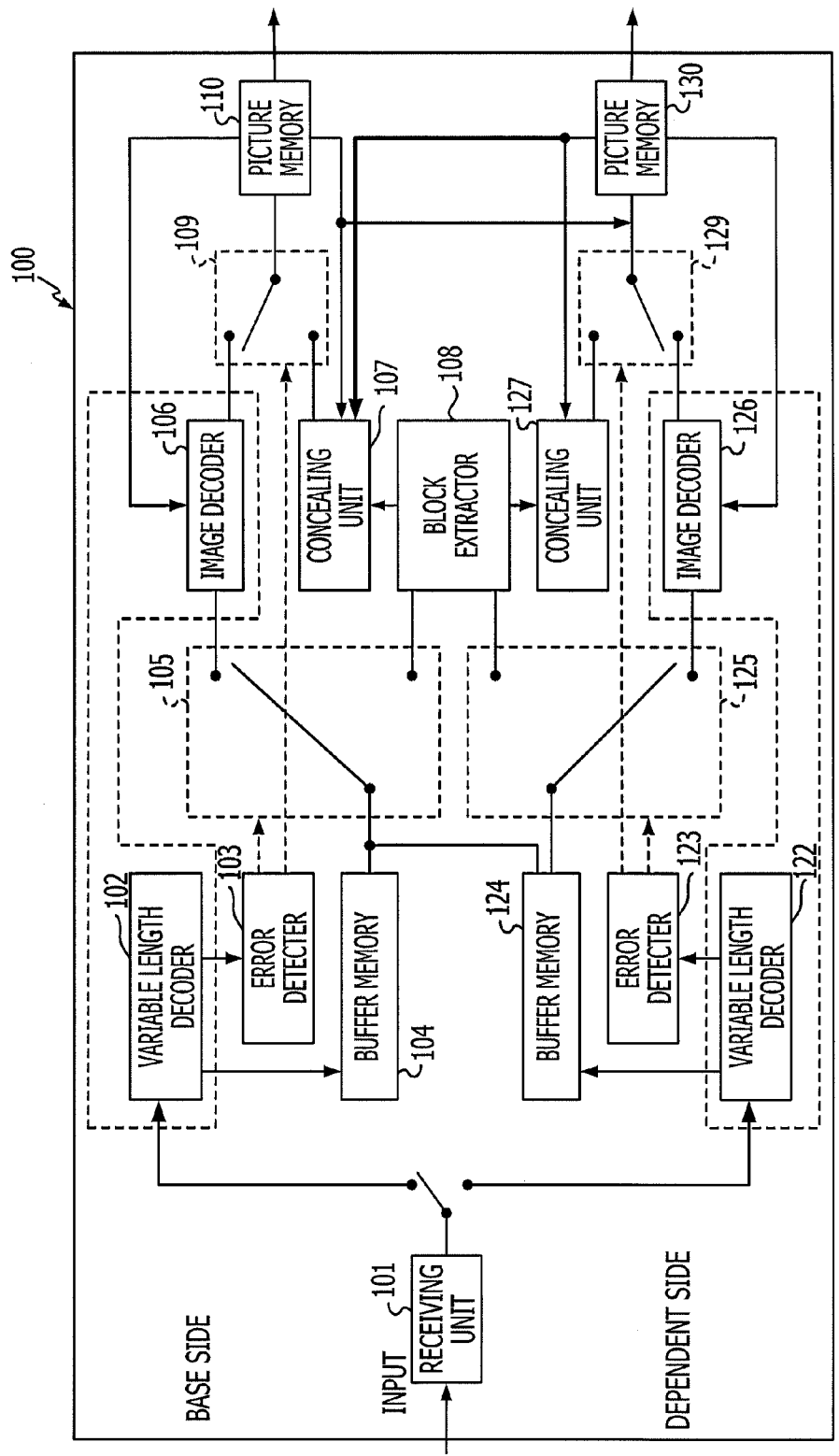
FIG. 3 is a block diagram illustrating an example of an outline configuration of a moving picture decoding device.

FIG. 3 is a block diagram illustrating an example of an outline configuration of a moving picture decoding device 100 according to the first embodiment. The moving picture decoding device 100 illustrated in FIG. 3 includes a receiving unit 101. The moving picture decoding device 100 has a variable length decoder 102, an error detector 103, a buffer memory 104, a selector 105, an image decoder 106, a concealing unit 107, a block extractor 108, a selector 109 and a picture memory 110 as a configuration to decode a picture for the base side. The moving picture decoding device 100 has a variable length decoder 122, an error detector 123, a buffer memory 124, a selector 125, an image decoder 126, a concealing unit 127, the block extractor 108, a selector 129 and a picture memory 130 as a configuration to decode a picture for the dependent side.

The receiving unit 101 receives data (hereinafter referred to as multi-view coded data) coded using a multi-view video coding technique. The multi-view coded data includes coded data of a moving picture. The coded data of the moving picture is provided for multiple views. The coded data of the moving picture is data obtained by coding pictures on a predetermined region basis.

When the receiving unit 101 receives the multi-view coded data, the receiving unit 101 divides the multi-view coded data into coded data for the multiple views, and outputs the coded data for the interested views to the variable length decoders 102 and 122. The receiving unit 101 may reference headers of the pictures of the multi-view coded data and thereby determine the views for which the coded data is provided. The headers of the pictures each include data that indicates the base side or the dependent side.

Figure 4:
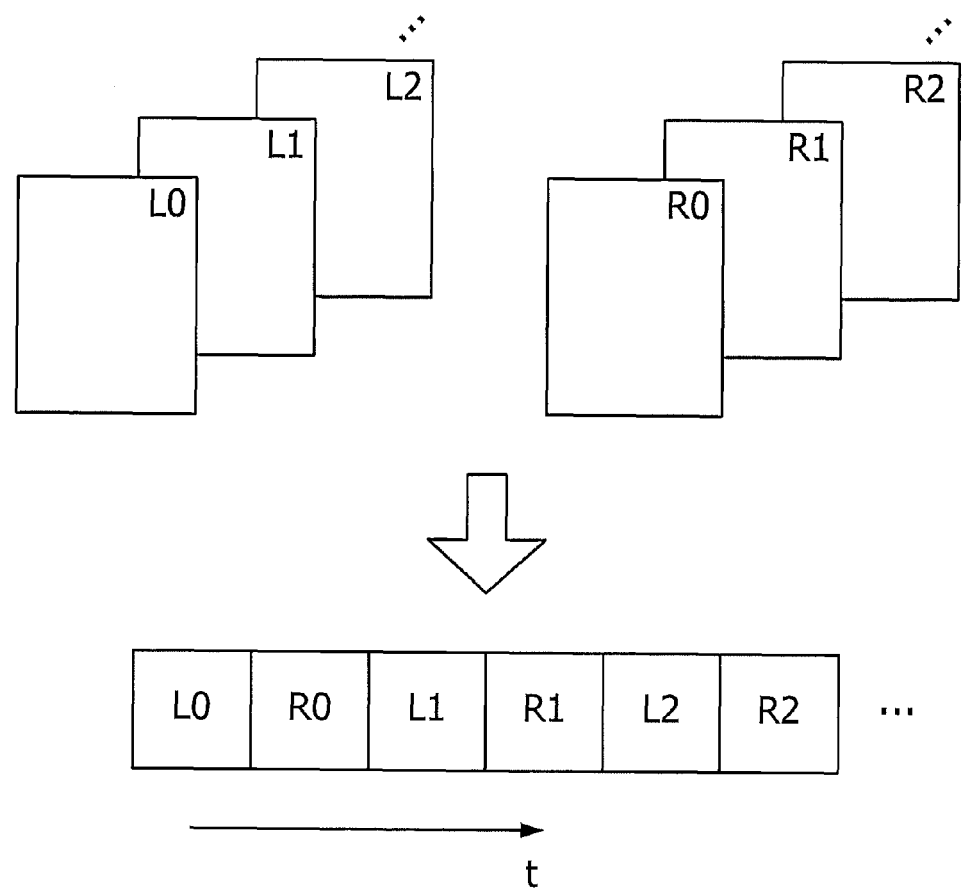
FIG. 4 is a diagram illustrating a stream of multi-view coded data.

FIG. 4 is a diagram illustrating an example of a stream of the multi-view coded data. In the example illustrated in FIG. 4, the coded data for the left view and the coded data for the right view are alternately mixed to form a single stream. A symbol "L0" illustrated in FIG. 4 is the first picture for the left view; a symbol "L1" is the second picture for the left view; a symbol "R0" is the first picture for the right view; and a symbol "R1" is a second picture of the right view. In the example illustrated in FIG. 4, a frame sequential scheme is used.

A scheme that is used to form the stream of the multi-view coded data is not limited to the frame sequential scheme. The stream of the multi-view coded data may be formed by a side-by-side scheme in which a picture for the right view and a picture for the left view are arranged side by side in a horizontal direction. In addition, the stream of the multi-view coded data may be formed by a top-and-bottom scheme in which a picture for the right view and a picture for the left view are arranged in a vertical direction.

Returning to FIG. 3, the configuration to decode a picture for the base side is described. The variable length decoder 102 receives the coded data for the base view. The variable length decoder 102 decodes information that expresses pictures included in the received coded data and has been coded according to variable length coding. In this case, the variable length decoder 102 decodes the information using variable length decoding corresponding to the variable length coding. The variable length decoding is a decoding scheme corresponding to Huffman coding or arithmetic coding, for example. The variable length decoder 102 decodes a quantized frequency coefficient (coefficient information), a quantization scale, a motion vector, macro-block type and the like for each of macro-blocks (MBs) and generates decoded data for each of the macro-blocks (MBs).

The variable length decoder 102 outputs identification numbers of the macro-blocks decoded according to the variable length decoding, pictures decoded according to the variable length decoding, information of the macro-blocks decoded according to the variable length decoding and the like to the error detector 103. The variable length decoder 102 outputs the decoded data such as motion vectors of the macro-blocks, the coefficient information of the macro-blocks, the quantization scales of the macro-blocks to the buffer memory 104.

In addition, the variable length decoder 102 performs the variable length decoding on data, which is included in a predetermined number (2 or more) of pictures and has been coded according to the variable length coding, in the order of the data to be decoded before processes to be performed by the image decoder 106, the block extractor 108 and the concealing unit 107.

Thus, the moving picture decoding device 100 may use a motion vector of a macro-block that is included in a picture to be decoded after decoding of a picture in which an error is to be concealed. The predetermined number of pictures that can be reference can be two or more and in a range up to a value obtained by adding 1 to the number of pictures for which a picture in which an error is to be concealed.

The error detector 103 detects a region that is included in a picture included in the coded data and in which an error occurs during the variable length decoding and/or image decoding. The error detector 103 detects whether or not an error occurs in each of macro-blocks or in each of predetermined blocks, while the macro-blocks or the predetermined blocks are unit regions for which motion compensation is performed. For example, the error detector 103 detects whether or not data that is necessary to decode a macro-block or a predetermined block is lost.

In the following description, a macro-block in which an error occurs is called an error macro-block (error MB). In order to simplify the description, predetermined regions that are included in each of pictures and subjected to an error detection are regarded as macro-blocks. Even when the predetermined regions that are included in each of the pictures and subjected to the error detection are regarded as predetermined blocks, the error detector 103 may detect an error by performing the same process as the process to be performed on the macro-blocks.

The error detector 103 may specify a macro-block to be detected whether or not an error occurs in the macro-block on the basis of the value of a macro-block address of the macro-block. Macro-block addresses are provided for the macro-blocks, respectively. The error detector 103 checks if all predetermined information that is defined by a standard for the coding scheme and provided for the specified macro-block exists. When all the information provided for the specified macro-block exists, the error detector 103 determines that there is no error in the specified macro-block. When at least a part of all the information provided for the specified macro-block does not exist, the error detector 103 determines that the macro-block is an error MB.

In addition, the error detector 103 may determine whether or not identification numbers such as macro-block addresses provided for macro-blocks are continuous. In this case, when the identification numbers are not continuous, the error detector 103 determines that a macro-block of which the identification number does not exist is an error MB.

The error detector 103 controls the selector 105 on the basis of whether or not an error exists. When the error detector 103 detects an error MB, the error detector 103 controls the selector 105 so that data that expresses the error MB and is stored in the buffer memory 104 may be read into the block extractor 108 and that the data that expresses the error MB and is stored in the buffer memory 124 may be read into the block extractor 108 when necessary. On the other hand, when the error detector 103 does not detect an error MB, the error detector 103 controls the selector 105 so that data that is stored in the buffer memory 104 may be read into the image decoder 106. The error detector 103 also controls the selector 109. This control is described later.

The buffer memory 104 temporarily stores data that has been decoded by the variable length decoder 102 and expresses the predetermined number of pictures. The data that is temporarily stored in the buffer memory 104 is motion vectors, coefficient information, quantization scales, MB types and the like.

The selector 105 is controlled by the error detector 103. When the error detector 103 notifies the selector 105 that an error MB exists, the selector 105 connects the buffer memory 104 to the buffer memory 124 and the block extractor 108.

When the error detector 103 notifies the selector 105 that an error MB does not exist, the selector 105 connects the buffer memory 104 to the image decoder 106.

The dependent side is described below. The receiving unit 101 references the headers of the pictures of the multi-view coded data and outputs the coded data for the dependent view to the variable length decoder 122.

The variable length decoder 122 performs the same process as the variable length decoder 102. For example, the variable length decoder 122 decodes variable length coded data included in pictures of the received data and outputs the decoded data to the buffer memory 124. In addition, the variable length decoder 122 outputs, to the error detector 123, the decoded data that is used to for error detection.

The error detector 123 performs the same process as the error detector 103. For example, the error detector 123 uses the aforementioned predetermined method to detect whether or not an error occurs in each of the macro-blocks included in the pictures. In addition, the error detector 123 controls the selector 125 on the basis of whether or not an error exists. The error detector 123 also controls the selector 129. This control is described later.

The buffer memory 124 temporarily stores the data decoded by the variable length decoder 122. The data that is temporarily stored in the buffer memory 124 is motion vectors, coefficient information, quantization scales, MB types and the like.

When the error detector 123 notifies the selector 125 that an error MB exists, the selector 125 connects the buffer memory 124 to the block extractor 108. When the error detector 123 notifies the selector 125 that an error MB does not exist, the selector 125 connects the buffer memory 124 to the image decoder 126.

Figure 5B:
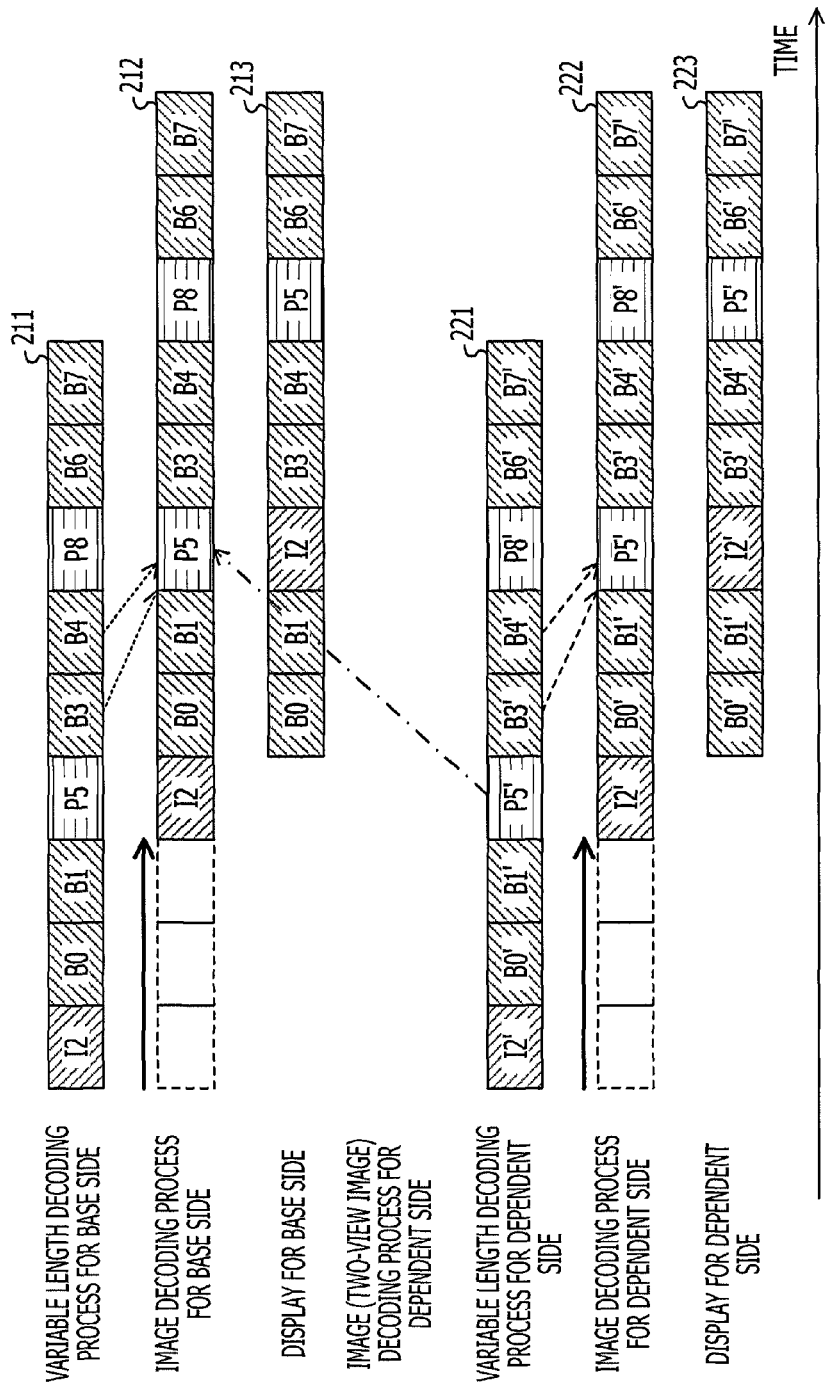

The preceding decoding that is performed by the variable length decoders 102 and 122 is described with reference to FIGS. 5A and 5B. FIGS. 5A and 5B diagrams illustrating an example of decoding processes that are performed in the first embodiment. Block strings illustrated in FIGS. 5A and 5B indicate parts of coded data of a moving picture. Each of blocks that are included in the block strings corresponds to one picture. Letters I, P and B that are represented in the blocks indicate the types of pictures, an I picture, a P picture and a B picture, respectively. Numbers that follow the letters indicate the order of the pictures to be reproduced. As the number of the reproducing order is smaller, the picture is reproduced earlier.

FIG. 5A is a diagram illustrating the example of the normal decoding process. A normal decoding order illustrated in FIG. 5A is indicated by a block string 201. The variable length decoding and image decoding are performed on pictures at the same timings in the order of pictures I2, B0, B1, P5, B3, B4, P8, B6 and B7.

A normal displaying order is indicated by a block string 202. The pictures are displayed in order of increasing number or in the order of the pictures B0, B1, I2, B3, B4, P5, B6, B7 and P8.

FIG. 5B is a diagram illustrating the example of the process of decoding pictures for the base side and the process of decoding pictures for the dependent side. A block string 211 indicates timings of the variable length decoding to be performed on the pictures for the base side. A block string 212 indicates timings of image decoding to be performed on the pictures for the base side. A block string 213 indicates timings of display of the pictures for the base side.

As indicated by the block strings 211 and 212, the variable length decoder 102 performs the variable length decoding earlier by a time corresponding to three pictures than the process to be performed by the image decoder 106 or the like, for example. Thus, the block extractor 108 and the concealing unit 107 may use a motion vector of a picture that is decoded after decoding of a picture in which an error is to be concealed.

For example, when the picture P5 has a region (error region) in which an error exists, the block extractor 108 and the concealing unit 107 may use information that is the results of the variable length decoding performed on the pictures B3 and B4 from which arrows that are indicated by dotted lines of FIG. 5B extend.

The pictures B3 and B4 are pictures that have been coded according to inter-frame coding using the picture P5 as a reference picture. Thus, the pictures B3 and B4 are the pictures coded by referencing the location of the picture P5. In the image decoding process, the pictures B3 and B4 are decoded after decoding of the picture P5. For example, even when information of a certain region of the picture P5 is lost due to an error, the concealing unit 107 may perform the error concealment process using motion vectors that are from regions included in the pictures B3 and B4 and for which the certain region of the picture P5 is referenced.

A block string 221 indicates timings of the variable length decoding to be performed on pictures for the dependent side. A block string 222 indicates timings of the image decoding to be performed on the pictures for the dependent side. A block string 223 indicates timings of display of the pictures for the dependent side.

As indicated by the block strings 221 and 222, the variable length decoder 122 performs the variable length decoding earlier by a time corresponding to three pictures than the process to be performed by the image decoder 126 or the like, for example. Thus, the block extractor 108 and the concealing units 107 and 127 may use a motion vector of a picture that is decoded after decoding of a picture in which an error is to be concealed. It is assumed that a picture P5' is coded using the picture P5 as a reference picture. Thus, in the image decoding process, the picture P5 is decoded after decoding of the picture P5'.

For example, when the picture 5 has a region in which an error exists, the block extractor 108 and the concealing unit 107 may use information that is the results of the variable length decoding performed on the picture P5' from which an arrow that is indicated by an alternate long and short dashed line of FIG. 5B extends. In addition, the block extractor 108 and the concealing unit 107 may use information that is the results of the variable length decoding performed on pictures B3' and B4' in the same manner.

The picture P5' is a picture coded according to inter-view coding using the picture P5 as a reference picture. Thus, the picture P5' is the picture coded by referencing a certain region of the picture P5. For example, even when information of the certain region of the picture P5 is lost due to an error, the concealing unit 107 may perform the error concealment process using a motion vector of a region that is included in the pictures P5' coded by referencing the certain region of the picture P5.

In addition, the block extractor 108 and the concealing unit 127 may uses a motion vector of a picture that is decoded after decoding of a picture in which an error is to be concealed.

For example, when the picture P5' has a region in which an error exists, the block extractor 108 and the concealing unit 127 may use information that is the results of the variable length decoding performed on the pictures B3' and B4' from which arrows that are indicated by broken lines of FIG. 5B extend.

The pictures B3' and B4' are pictures coded according to inter-frame coding using the picture P5' as a reference picture. Thus, the pictures B3' and B4' are the pictures coded by referencing the position of the picture P5'. The pictures B3' and B4' are decoded after decoding of the picture P5'. For example, when information of a certain region of the picture P5' is lost due to an error, the concealing unit 127 may perform the error concealment process using motion vectors that are from regions included in the pictures B3' and B4' and for which the certain region of the picture P5' is referenced.

Returning to FIG. 3, the image decoding that is performed on pictures for the base side and the dependent side, and the error concealment process that is performed on pictures for the base side and the dependent side, are described below. The image decoder 106 for the base side decodes each of the macro-blocks of the pictures that correspond to the data decoded according to the variable length decoding. For example, the image decoder 106 performs an inverse quantization process and an inverse orthogonal transform process on the coefficient information included in the data decoded according to the variable length decoding. The image decoder 106 adds a differential signal obtained by the inverse orthogonal transform process to a predicted image obtained on the basis of a corresponding block of a reference picture specified by a motion vector. The reference picture is stored in the picture memory 110. In this manner, the macro-blocks of the pictures are decoded.

The image decoder 106 outputs the decoded macro-blocks of the pictures, the macro-block addresses of the decoded macro-blocks, and the identification numbers of the pictures including the decoded macro-blocks to the selector 109.

The image decoder 126 for the dependent side performs the same process as the image decoder 106 for the base side so as to decode the macro-block of the picture. The difference between the image decoder 106 and the image decoder 126 is that the image decoder 126 may use the pictures decoded by the image decoder 106 and provided for the base side and the pictures decoded by the image decoder 126 and provided for the dependent side as reference pictures. On the other hand, the image decoder 106 may use only the pictures decoded by the image decoder 106 as reference pictures.

Next, the block extractor 108 is described. The block extractor 108 receives a motion vector from at least one of the buffer memories 104 and 124, uses the motion vector to estimate a similar macro-block to an error MB, and extracts the estimated macro-block. The block extractor 108 is described in detail with reference to FIG. 6.

Figure 6:
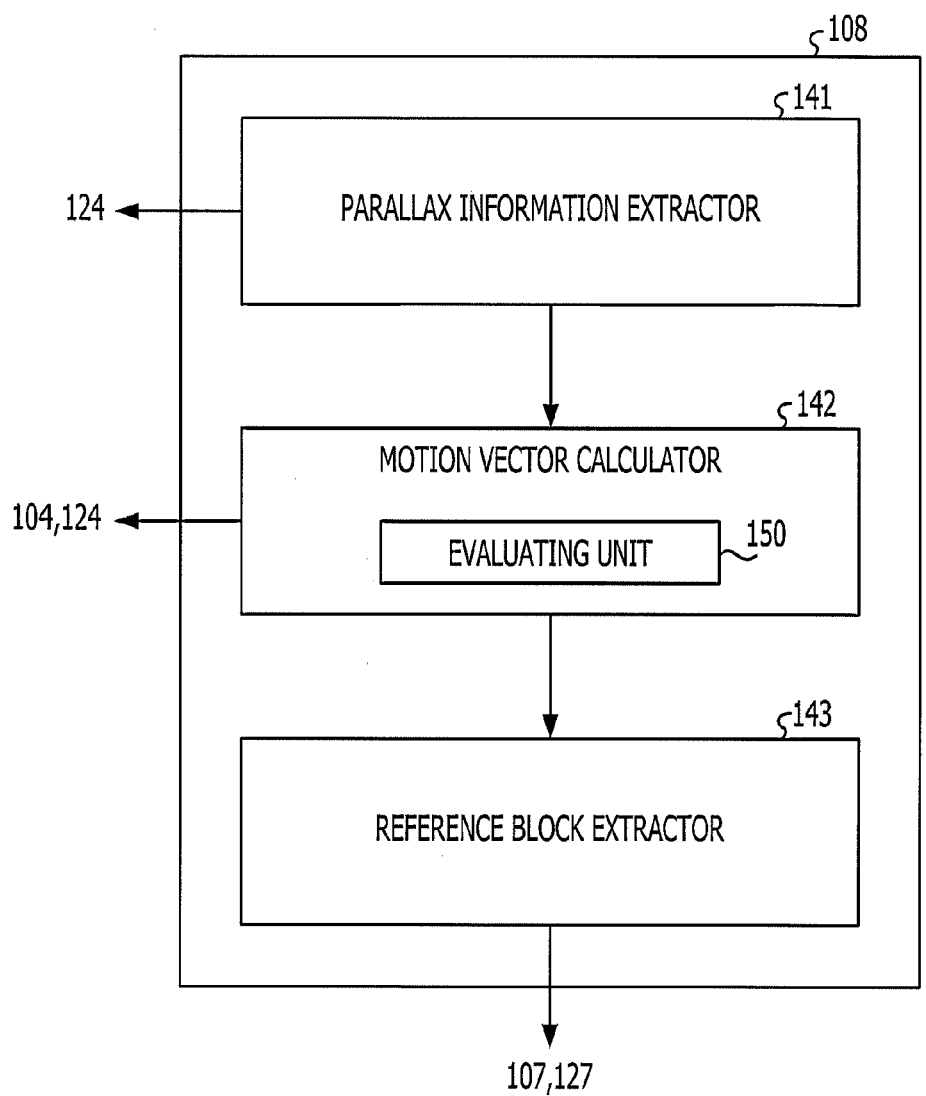
FIG. 6 is a block diagram illustrating an example of the configuration of a block extractor.

FIG. 6 is a block diagram illustrating an example of the configuration of the block extractor 108. The block extractor 108 includes a parallax information extractor 141, a motion vector calculator 142 and a reference block extractor 143. First, details of a process that is performed by the block extractor 108 when an error MB occurs in a picture for the base side are described.

When an error MB occurs in a picture for the base side, the parallax information extractor 141 extracts, from the dependent side, a motion vector for which the error MB in the base side is referenced. Since this motion vector is a motion vector between the picture for the base view and a picture for the dependent side, the motion vector indicates parallax information. The parallax information extractor 141 outputs the extracted parallax information to the motion vector calculator 142. When the dependent side motion vector for which the error MB is referenced does not exist in the buffer memory 124, the parallax information extractor 141 notifies the motion vector calculator 142 that the motion vector for which the error MB is referenced does not exist in the buffer memory 124.

The motion vector calculator 142 specifies a macro-block (hereinafter also referred to as a parallax MB) that has the received parallax information. Then, the motion vector calculator 142 extracts, from the buffer memory 124, a motion vector (hereinafter also referred to as a reference source motion vector) for which the parallax MB is referenced.

The motion vector calculator 142 determines whether or not a macro-block (hereinafter also referred to as a reference source MB) that has the reference source motion vector has another motion vector. When a macro-block (hereinafter also referred to as an MB to be referenced) that is included in a decoded picture is referenced for the aforementioned other motion vector, the motion vector calculator 142 uses the two motion vectors of the reference source MB to calculate a motion vector for error concealment. The motion vector for the error concealment is hereinafter also referred to as a concealment motion vector. The motion vector calculator 142 outputs the calculated concealment motion vector to the reference block extractor 143.

The concealment motion vector includes, as vector elements, the amounts of shifting in horizontal and vertical directions between the error MB and the MB to be referenced in the pictures, and the number of pictures arranged between a picture provided for the dependent side and corresponding to the picture including the error MB and the picture including the MB to be referenced.

When the motion vector calculator 142 receives, from the parallax information extractor 141, the notification indicating that the motion vector does not exist, the motion vector calculator 142 extracts, from the buffer memory 104, the motion vector for which the error MB is referenced. The motion vector calculator 142 determines whether or not a block (hereinafter also referred to as a same-view reference source MB) that has the motion vector for which the error MB is referenced has another motion vector. When a decoded picture is referenced for the other motion vector, the motion vector calculator 142 uses the two motion vectors of the single-view reference source MB to calculate a concealment motion vector. The motion vector calculator 142 outputs the calculated concealment motion vector to the reference block extractor 143.

The reference block extractor 143 extracts the macro-block address of a macro-block included in a decoded picture and specified by the received concealment motion vector, and extracts the identification number of the picture that includes the macro-block. The reference block extractor 143 outputs the extracted macro-block address and the extracted identification number to the concealing unit 107. The macro-block that is specified by the reference block extractor 143 is a macro-block estimated as a similar macro-block to the error MB.

Next, details of a process that is performed by the block extractor 108 when an error MB occurs in a picture for the dependent side are described. When an error MB occurs in a picture for the dependent side, the motion vector calculator 142 extracts, from the buffer memory 124, a motion vector for which the error MB is referenced. The motion vector calculator 142 selects, from the buffer memory 124, a block (hereinafter also referred to as a same-view reference source MB) that is a reference source of the extracted motion vector.

The motion vector calculator 142 determines whether or not the selected same-view reference source MB includes another motion vector. When a decoded picture is referenced for the other motion vector, the motion vector calculator 142 uses the two motion vectors of the same-view reference source MB to calculate a concealment motion vector. The motion vector calculator 142 outputs the calculated concealment motion vector to the reference block extractor 143.

The reference block extractor 143 extracts the macro-block address of a macro-block (MB to be referenced) included in a decoded picture and specified by the received concealment motion vector, and extracts the identification number of the picture that includes the macro-block. The reference block extractor 143 outputs the extracted macro-block address and the extracted identification number to the concealing unit 127.

The motion vector calculator 142 has an evaluating unit 150. When a plurality of reference source MBs exist, the evaluating unit 150 determines one of the reference source MBs. The evaluating unit 150 uses information included in the reference source MBs to calculate evaluation values. The evaluating unit 150 selects one of the reference source MBs on the basis of the calculated evaluation values. The evaluating unit 150 is described later in detail. When a plurality of parallax MBs and a plurality of same-view reference source MBs exist, the evaluating unit 150 calculates evaluation values and selects one of the macro-blocks on the basis of the calculated evaluation values.

Figure 7:
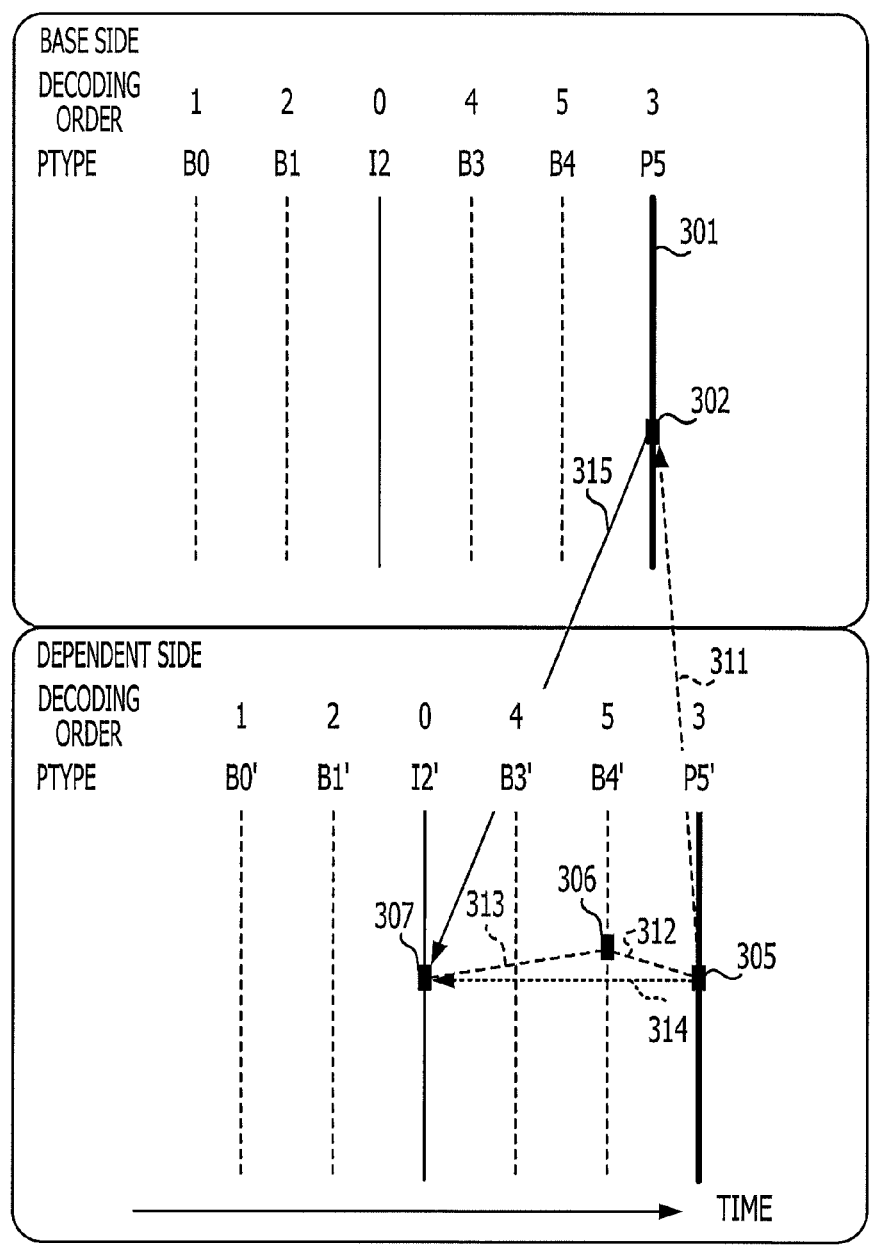
FIG. 7 is a diagram illustrating relationships (first relationship example) among an error MB, a parallax MB, a reference source MB and an MB to be referenced.

Next, relationships among an error MB, a parallax MB, a reference source MB and an MB to be referenced are described, and a calculation of a concealment motion vector is described in detail. FIG. 7 is a diagram illustrating relationships (first relationship example) among an error MB, a parallax MB, a reference source MB and an MB to be referenced. The example illustrated in FIG. 7 indicates the pictures I2', B3', B4' and P5' that are provided for the dependent side and have the same positional relationship as the pictures I2, B3, B4 and P5, in a similar manner to the example illustrated in FIGS. 5A and 5B. Symbols "PType" illustrated in FIG. 7 indicate the types of pictures.

For example, when information of an MB 302 included in a picture P5 301 that is provided for the base side and is to be decoded third among pictures for the base side is lost due to an error, a macro-block (parallax MB) 305 that is shifted by an amount corresponding to parallax information 311 from the error MB 302 and for which the error MB 302 is referenced exists in the picture P5' that is provided for the dependent side and is to be decoded third among pictures for the dependent side.

The shifted amount that corresponds to the parallax information 311 is also indicated by MVD. Since the picture P5' is to be decoded immediately after decoding of the picture P5 for the base side, a decoded image of the picture P5' does not exist when the picture P5 is decoded.

Since the pictures B for the dependent side are decoded according to the variable length decoding in advance, information of vectors 312 and 313 of a reference source MB 306 for which the parallax information MB 305 is referenced exists in the buffer memory 124. The motion vector calculator 142 uses the information of the vectors 312 and 313 of the reference source MB 306 to generate a temporary concealment motion vector (MVC') 314.

In the example illustrated in FIG. 7, when the backward motion vector MVB' 312 of the reference source MB 306 included in the picture B4' points to the parallax information MB 305, the motion vector calculator 142 uses the forward motion vector FMV' 313 of the reference source MB 306 to calculate the temporary concealment motion vector 314 according to Equation (1).

MVC'=MVF'−MVB' Equation (1)

The motion vector calculator 142 uses the temporary concealment motion vector 314 and the parallax information (MVD) 311 to calculate a concealment motion vector (MVC) 315 according to Equation (2).

MVC=MVC'−MVD Equation (2)

A picture to be referenced for the temporary concealment motion vector 314 is the picture I2'. The picture I2' is already decoded by the image decoder 126 when the picture P5 is decoded. An image that is predicted using an MB 307 (to be referenced) of the picture I2' and the concealment motion vector 315 is regarded as a block for error concealment.

The reference block extractor 143 may use the MB 307 (to be referenced) of the picture I2' and the temporary concealment motion vector (MVC') 314 to decode the parallax information MB 305 of the picture P5' and may use the parallax information 311 to perform the error concealment process on the error MB 302.

Figure 8:
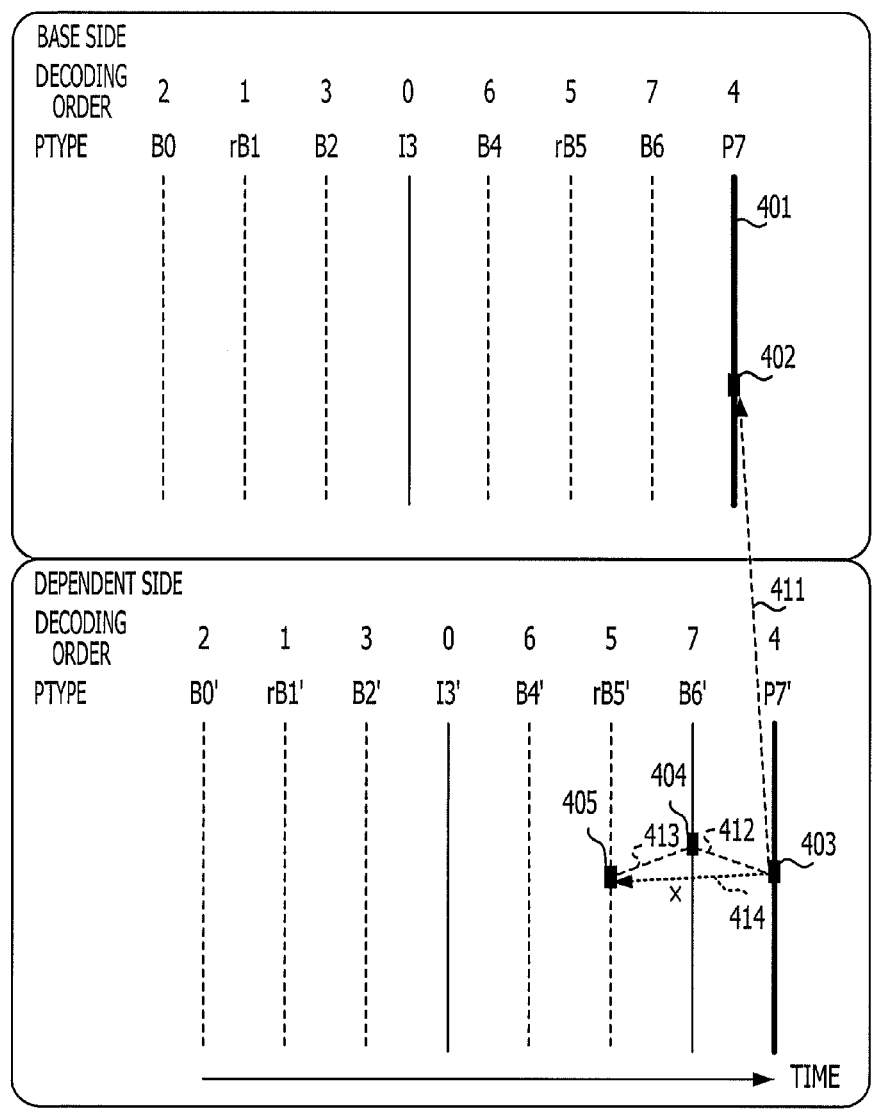
FIG. 8 is a diagram illustrating relationships (second relationship example) among an error MB, a parallax MB, a reference source MB and an MB to be referenced.

FIG. 8 is a diagram illustrating relationships (second relationship example) among an error MB, a parallax MB, a reference source MB and an MB to be referenced. The example illustrated in FIG. 8 indicates that the error concealment process cannot be performed when a reference source MB that has a motion vector for which a parallax MB is referenced is an MB to be unidirectionally predicted, and a MB to be referenced exists in a B picture (reference B picture). Symbols "Ptype" illustrated in FIG. 8 indicate the types of pictures.

Pictures I3', rB1', B0', B2', P7', rB5', B4' and B6' for the dependent side are decoded in this order. The pictures that are indicated with rB are reference B pictures.

It is assumed that when an error MB 402 exists in a picture P7 401, the variable length decoding process is completely performed on the pictures P7', rB5', B4' and B6' before the image decoding is performed on the picture P7 401.

When the error MB 402 exists in the picture P7 401 for the base side, the picture P7' for the dependent side has a macro-block (parallax MB) 403 that is shifted by an amount corresponding to parallax information 411 from the error MB 402 and for which parallax MB 403, the error MB 402 is referenced. Since the picture P7' is a picture to be decoded immediately after decoding of the picture P7 for the base side, a decoded image of the picture P7' does not exist when the picture P7 is decoded.

Since the pictures B for the dependent side are decoded according to the variable length decoding in advance, information of vectors 412 and 413 of a reference source MB 404 (included in the picture B6') for which the parallax MB 403 of the picture P7' is referenced exists in the buffer memory 124. The motion vector calculator 142 uses the information of the vectors 412 and 413 of the reference source MB 404 to generate a temporary concealment motion vector (MVC') 414.

In the example illustrated in FIG. 8, it is assumed that even when the backward motion vector MVB' 412 of the reference source MB 404 included in the picture B6' points to the reference source MB 403, the block 405 of the picture rB5' is referenced for the forward motion vector MVF' 413. In this case, even when the forward motion vector FMV' 413 of the reference source MB 404 is used in the same manner as the example illustrated in FIG. 7, the temporary concealment motion vector 414 cannot be calculated. The reason is as follows. A picture to be referenced for the temporary concealment motion vector 414 is the picture rB5'. The picture rB5' is decoded after decoding of the picture P7'. Thus, a MB to be referenced does not exist.

Therefore, as illustrated in FIG. 8, the reference source MB 404 from which the forward motion vector points to the MB of the picture that has yet to be decoded is not selected by the motion vector calculator 142.

A plurality of reference source MBs for which a parallax MB is referenced exist in some cases. A plurality of pictures (such as the pictures B3' and B4') for which the single picture P5' may be referenced exist. In addition, a motion prediction may be performed using a plurality of motion vectors for each of blocks. Thus, there is a possibility that a plurality of reference source MBs for which a parallax MB is referenced exist.

The evaluating unit 150 of the motion vector calculator 142 illustrated in FIG. 6 selects one of the macro-blocks by evaluating a plurality of the reference source MBs.

When a parallax MB is referenced for a plurality of macro-blocks, the evaluating unit 150 uses information of the macro-blocks to determine a macro-block that is most suitable for the motion prediction and is among the macro-blocks. The information of each of the macro-blocks includes the type of a prediction, differential information (coefficient information), and a component of a motion vector.

The determination using the type of the prediction is described below. For example, a block for which the parallax MB of the picture P5' (illustrated in FIG. 7) is referenced has at least a backward motion vector. Thus, a backward MB or a bi-direction MB may be considered as the type of a prediction. In this case, when the block is the backward MB, the backward MB does not have a forward motion vector for which a decoded picture may be referenced. Thus, the bi-direction MB is prioritized over the backward MB, and the evaluating unit 150 selects the bi-direction MB.

Next, the determination using the differential information is described. In the coding process, to obtain the differential information, the difference between frames is calculated using a motion vector. Then, the difference (predicted difference) is subjected to discrete cosine transform (DCT) and a quantization process. Then, the difference is coded according to the variable length coding. As the differential information after the variable length decoding, a quantization coefficient (Coef) and a quantization value (Qscale) are obtained for each of the macro-blocks.

In order to more accurately use the differential information, the difference is subjected to an inverse quantization process and an inverse DCT process so that the differential information is calculated on a pixel basis and the sum of absolute values of components of the differential information or the like is calculated. In order to simplify the process, the following evaluation is performed.

It is assumed that a plurality of candidate blocks MB0, MB1, . . . , MBn exist, quantization values (Qscale values) of the candidate blocks are Q0, Q1, . . . , Qn, and the values of quantization coefficients of the candidate blocks are Coef0_i,j, Coef1_i,j, . . . , Coefn_i,j. The evaluating unit 150 selects a macro-block that causes the difference to be smallest.

As the method for selecting a macro-block, there are at least three examples described below.

FIRST EXAMPLE

The evaluating unit 150 determines that a macro-block of which the quantization scale is smallest is the macro-block that causes the difference to be smallest.

```
SelectQ = maxQ;
  for (x = 0); x < n; x++) {
    SelectQ = min(SelectQ, Qx); //When SelectQ is updated, the selected
MB is also updated
  }
```

SECOND EXAMPLE

The evaluating unit 150 determines a macro-block that causes the sum of absolute differences among the quantization coefficients to be smallest is the macro-block that causes the difference to be smallest.

```
SelectCoef = maxCoeff;
  for (x = 0; x < n; x++) {
    SelectCoef = min(SelectCoef, Σi,j, |Coefx_i,j|); //When SelectQ is
updated, the selected MB is also updated
  }
```

THIRD EXAMPLE

The evaluating unit 150 simply determines that a macro-block that causes the number of valid coefficients among the quantization coefficients to be smallest is the macro-block that causes the difference to be smallest.

```
SelectNum = maxNum;
  for (x = 0; x < n; x++) {
    SelectNum = min(SelectNum, Counttif(Coefx_i,j !=0)); //When
SelectNum is updated, the selected MB is also updated
  }
```

The evaluating unit 150 may use any of the aforementioned three examples to select one of the macro-blocks.

The evaluating unit 150 determines that a macro-block that has vector components for which the largest number of areas are referenced as reference areas to which motion vectors point is the macro-block that causes the difference to be smallest.

When the macro-blocks each have a size of 16×16, an overlapping region of the macro-block of the original picture and the macro-block of a reference picture is larger as a value of a component of a motion vector is closer to any of multiples of 16. From this standpoint, the motion vector is calculated.

It is assumed that values of components of motion vectors are each close to any of multiples of 16, and the remainders of divisions of the values of the components of the motion vectors by 16 are 0, 1, 2, 3, . . . , 14, and 15. In this assumption, the evaluating unit 150 provides a priority to each of the values 1 to 15 so that the priority is increased in the order of 0, 1, 15, 2, 14, 3, 13, . . . , 7, 9 and 8. The evaluating unit 150 selects a macro-block on the basis of the priorities according to the following calculation formula. The following calculation formula means that in order to select a motion vector that has a component of a value that is largely different from the value of 8, a motion vector that has a component of a large absolute value among values of −8 to 7 obtained by subtracting 8 from the values of 0 to 15 is selected.

```
SelectMV = MV0;
  for (x = 0; x < n; x++) {
    SelectMV = min(|mod(SelectMV, 16) − 8, |mod(MVx, 16) − 8|); //When
SelectMV is updated, the selected MV is also updated
//When the horizontal size of the MB and the vertical size of the MB are
referenced, mod16 is used for a frame prediction, and mod8 is
used for a field prediction
  }
```

The accuracy (such as quarter-pixel accuracy (a value of 2 indicates a single motion vector) or half-pixel accuracy (a value of 4 indicates a single motion vector)) of representing the motion vector varies depending on the coding method. Thus, the evaluating unit 150 changes the calculation formula depending on the accuracy.

For example, when the motion vector is represented by the quarter-pixel accuracy, the following calculation formula is used.

```
SelectMV = MV0;
for (x = 0; x < n; x++) {
    SelectMV = max(|mod(SelectMV, 64) − 32|, |mod(MVx, 64) − 32|);
    //When SelectMV is updated, the selected MB is also updated
}
```

The evaluating unit 150 changes the calculation formula depending on the accuracy as described above. The evaluating unit 150 may not change the calculation formula depending on the accuracy of representing the motion vector. The evaluating unit 150 may change the calculation formula depending on the sizes of the macro-blocks when the macro-blocks do not have a size of 16×16.

Thus, even when a plurality of reference source MBs exist, an appropriate block may be selected by the evaluating unit 150.

The case in which a plurality of parallax MBs for which an error MB is referenced exist may be considered. In this case, the motion vector calculator 142 may select one of the parallax MBs by making the determination using the differential information.

In addition, as illustrated in FIG. 7, there is a possibility that a plurality of pictures for which the picture P5 is referenced are not only the picture P5' for the dependent side but also the pictures B3 and B4 for the base side that is the same view as the picture P5. In addition, since a motion prediction may be performed using a plurality of motion vectors for each of blocks, there is a possibility that a plurality of blocks (same-view reference source MB and parallax MB) for which the error MB of the picture P5 is referenced in a motion prediction exist.

In this case, when a plurality of blocks for which the error MB is referenced exist, the evaluating unit 150 determines whether a block for the same view or a block for the other view is prioritized. In the present embodiment, the block for the other view is prioritized and used. However, the block for the same view may be prioritized.

Next, when a plurality of blocks that are provided for the determined view and for which the error MB is referenced exist, one of the blocks is selected by the evaluating unit 150 in the aforementioned manner. When a parallax MB is selected, the evaluating unit 150 selects one of the blocks on the basis of the determination using differential information according to the second example or the determination using motion vectors according to the third example.

Returning to FIG. 3, the concealing unit 107 for the base side uses the information of the block extracted by the block extractor 108 and the concealment motion vector to generate a macro-block for concealment. The concealing unit 107 outputs the macro-block for concealment to the selector 109.

Thus, since the concealing unit 107 uses parallax information decoded in advance, the concealing unit 107 may conceal an error using not only a decoded picture for the same view but also a decoded picture for the other view.

The selector 109 is controlled by the error detector 103. When an error MB exists, the selector 109 selects a macro-block output from the concealing unit 107. When an error MB does not exist, the selector 109 selects a macro-block output from the image decoder 106. The selector 109 sequentially arranges macro-blocks decoded by the image decoder 106 (or arranges macro-blocks decoded by the image decoder 106 and a macro-block generated by the concealing unit 107) on the basis of the identification number of a picture including the macro-blocks and the macro-block addresses of the macro-blocks and outputs the arranged macro-blocks to the picture memory 110.

The picture memory 110 temporarily stores the macro-blocks output from the selector 109 on a picture basis. Pictures that are stored in the picture memory 110 are output to a display unit or the like in the order of the pictures to be displayed. In addition, there is a possibility that the pictures that are stored in the picture memory 110 are each referenced for a picture for the base side or a picture for the dependent side. Thus, the pictures that are stored in the picture memory 110 are output to the image decoder 106 and the picture memory 130 when necessary. Furthermore, the pictures that are stored in the picture memory 110 are also used for error concealment. Thus, the pictures that are stored in the picture memory 110 are read by the concealing unit 107 when necessary.

The concealing unit 127 for the dependent side basically performs the same process as the concealing unit 107 for the base side. The concealing units 107 and 127 are different from each other in that the concealing unit 127 performs the error concealment process using a decoded picture for the same view.

The selector 129 performs the same process as the selector 109 for the base side. For example, the selector 129 sequentially arranges macro-blocks decoded by the image decoder 126 (or arranges macro-blocks decoded by the image decoder 126 and a macro-block generated by the concealing unit 127) on the basis of the identification number of a picture including the macro-blocks and the macro-block addresses of the macro-blocks and outputs the arranged macro-blocks to the picture memory 130.

The picture memory 130 temporarily stores the macro-blocks output from the selector 129 on a picture basis. The picture memory 130 temporarily stores the pictures that are provided for the base side and have been output from the picture memory 110. This is due to the fact that the pictures for the base side may be referenced for pictures for the dependent side.

In addition, the pictures that are provided for the dependent side and stored in the picture memory 130 are output to the display unit or the like in the order of the pictures to be displayed. Furthermore, the pictures that are provided for the dependent side and stored in the picture memory 130 are read by the concealing unit 127. Furthermore, the pictures that are provided for the base side and the dependent side and stored in the picture memory 130 are output to the image decoder 126 as reference pictures when necessary.

With the aforementioned configuration, each of the concealing units 107 and 127 may use a motion vector decoded according to the variable length decoding before the other processes and perform the error concealment process on a macro-block estimated to be similar to an error MB. In addition, since the concealing unit 107 may use a motion vector (parallax information) for which a decoded picture for the other view is referenced, the concealing unit 107 may perform the error concealment process on a macro-block estimated to be similar to an error MB and included in the decoded picture for the other view.

Figure 9:
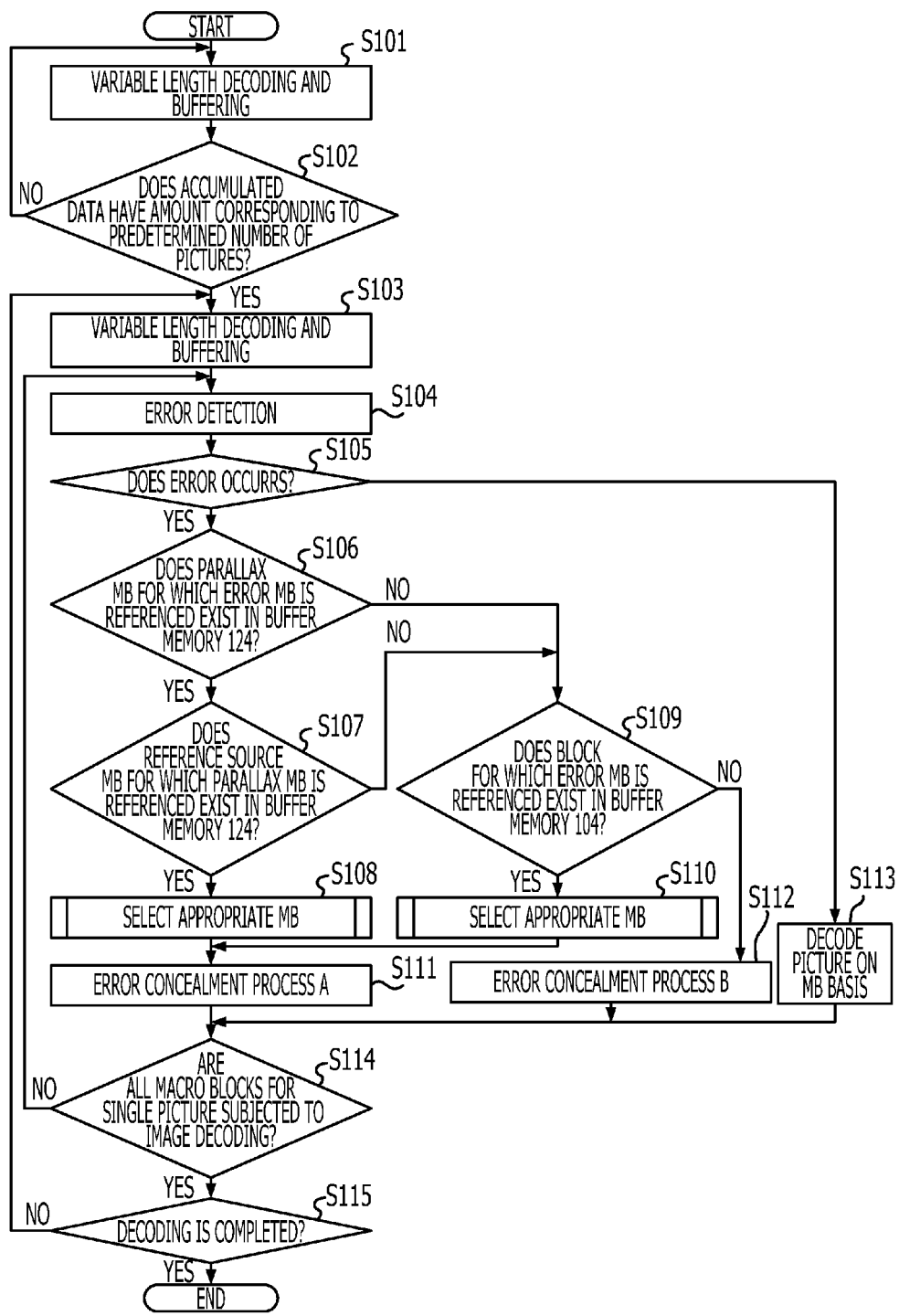
FIG. 9 is a flowchart of an example of a moving picture decoding process to be performed for a base side.

Next, operations of the moving picture decoding device according to the first embodiment are described. FIG. 9 is a flowchart of an example of a moving picture decoding process for the base side.

In operation S101, the variable length decoder 102 performs the variable length decoding on coded data that expresses a single picture for the base side and has been divided by the receiving unit 101, before the image decoding to be performed by the image decoder 106. The variable length decoder 102 causes the decoded data (such as motion vectors and coefficient information) obtained by the variable length decoding to be stored in the buffer memory 104. In addition, the variable length decoder 102 outputs, to the error detector 103, data (such as macro-block addresses) that is necessary for error detection.

In operation S102, the moving picture decoding device 100 determines whether or not decoded data that is accumulated in the buffer memory 104 has an amount corresponding to the predetermined number of pictures. When the decoded data that is accumulated in the buffer memory 104 has the amount corresponding to the predetermined number of pictures (Yes in operation S102), the process proceeds to operation S103. When the decoded data that is accumulated in the buffer memory 104 does not have the amount corresponding to the predetermined number of pictures (No in operation S102), the process returns to operation S101. Thus, the variable length decoder 102 may performs the variable length decoding on the predetermined number of pictures before the image decoding to be performed by the image decoder 106.

In operation S103, the variable length decoder 102 performs the variable length decoding on the predetermined number of the next pictures. The variable length decoder 102 causes decoded data (such as motion vectors and coefficient information) obtained by the variable length decoding to be stored in the buffer memory 104. In addition, the variable length decoder 102 outputs, to the error detector 103, data (such as macro-block addresses) that is necessary for error detection.

In operation S104, the error detector 103 detects, on a macro-block basis on the basis of the data received from the variable length decoder 102, an error region from pictures in order from a picture to be first decoded to a picture to be lastly decoded. The error detector 103 may detect an error when the values of the macro-block addresses are not continuous, for example.

In operation S105, the error detector 103 determines whether or not an error exists in a macro-block to be detected. When an error exists in the macro-block to be detected (Yes in operation S105), the process proceeds to operation S106. When an error does not exist in the macro-block to be detected (No in operation S105), the process proceeds to operation S113.

In operation S106, the block extractor 108 determines whether or not a parallax MB for which the error MB is referenced exists in the buffer memory 124 for the dependent side. The parallax MB is a macro-block that is provided for the dependent side and has a motion vector (parallax information) for which the error MB is referenced. When the parallax MB exits in the buffer memory 124 (Yes in operation S106), the process proceeds to operation S107. When the parallax MB does not exist in the buffer memory 124 (No in operation S106), the process proceeds to operation S109.

In operation S107, the block extractor 108 determines whether or not a reference source MB for which the parallax MB is referenced exists in the buffer memory 124 for the dependent side. The reference source MB is a macro-block that is provided for the dependent side and has a motion vector for which the parallax MB is referenced. When the reference source MB exists in the buffer memory 124 (Yes in operation S107), the process proceeds to operation S108. When the reference source MB does not exist in the buffer memory 124 (No in operation S107), the process proceeds to operation S109.

In operation S108, when a plurality of reference source MBs exist in the buffer memory 124, the block extractor 108 selects an appropriate macro-block (MB) that is estimated to be similar to the error MB. Operation S108 is described later with reference to FIG. 11.

In operation S109, the block extractor 108 determines whether or not a same-view reference source MB for which the error MB is referenced exists in the buffer memory 104. The same-view reference source MB is included in a picture for the base side and has a motion vector for which the error MB is referenced. When the same-view reference source MB exists in the buffer memory 104 (Yes in operation S109), the process proceeds to operation S110. When the same-view reference source MB does not exist in the buffer memory 104 (No in operation S109), the process proceeds to operation S112.

In operation S110, when a plurality of same-view reference source MBs exist in the buffer memory 104, the block extractor 108 selects an appropriate macro-block that is estimated to be similar to the error MB. This selection operation is performed in the same manner as operation S108 and described later with reference to FIG. 11.

In operation S111, the concealing unit 107 uses, for an error concealment process (error concealment process A), the macro-block included in a decoded picture and estimated to be similar to the error MB using the motion vector decoded according to the variable length decoding before the image decoding. When the process is performed through operation S108, the concealing unit 107 uses, for the error concealment process, a macro-block estimated to be similar to the error MB and included in a decoded picture for the dependent side that is the other view. When the process is performed through operation S110, the concealing unit 107 uses, for the error concealment process, a macro-block estimated to be similar to the error MB and included in a decoded picture for the base side that is the same view.

In operation S112, when a motion vector for which the error MB is referenced is not among motion vectors decoded according to the variable length decoding before the image decoding, the concealing unit 107 performs a known error concealment process (error concealment process B). In the known error concealment process, a macro-block that is referenced for a motion vector of a macro-block located near the error MB is used to conceal the error, or a macro-block that is included in a picture decoded immediately before decoding of a picture including the error MB and is located at the same position as the error MB is used to conceal the error, for example. In operation S112, any error concealment process may be performed as long as the concealing process is a known error concealment process in which the motion vectors obtained by the variable length decoding performed before the image decoding are not used.

In operation S113, the image decoder 106 decodes the picture on a macro-block basis as described above.

In operation S114, the moving picture decoding device 100 determines whether or not macro-blocks for a single picture are subjected to the image decoding process. When any of the macro-blocks for the single picture is not subjected to the image decoding process (No in operation S114), the process returns to operation S104 so that the error detection is performed on the next macro-block. When all the macro-blocks for the single picture are subjected to the image decoding process (Yes in operation S114), the process proceeds to operation S115.

The selector 109 arranges the macro-blocks decoded by the image decoder 106 (or arranges the macro-blocks decoded by the image decoder 106 and the macro-block subjected to the error concealment process by the concealing unit 107) on the basis of the macro-block addresses and the identification number of the picture. Then, the selector 109 causes the macro-blocks to be stored in the picture memory 110 on a picture basis.

In operation S115, the moving picture decoding device 100 determines whether or not all pictures that are included in the coded data are decoded. When all the pictures are decoded (Yes in operation S115), the moving picture decoding device 100 terminates the decoding process. When any of all the pictures is not decoded (No in operation S115), the process returns to operation S103 so that the decoding process is performed on the single picture.

Figure 10:
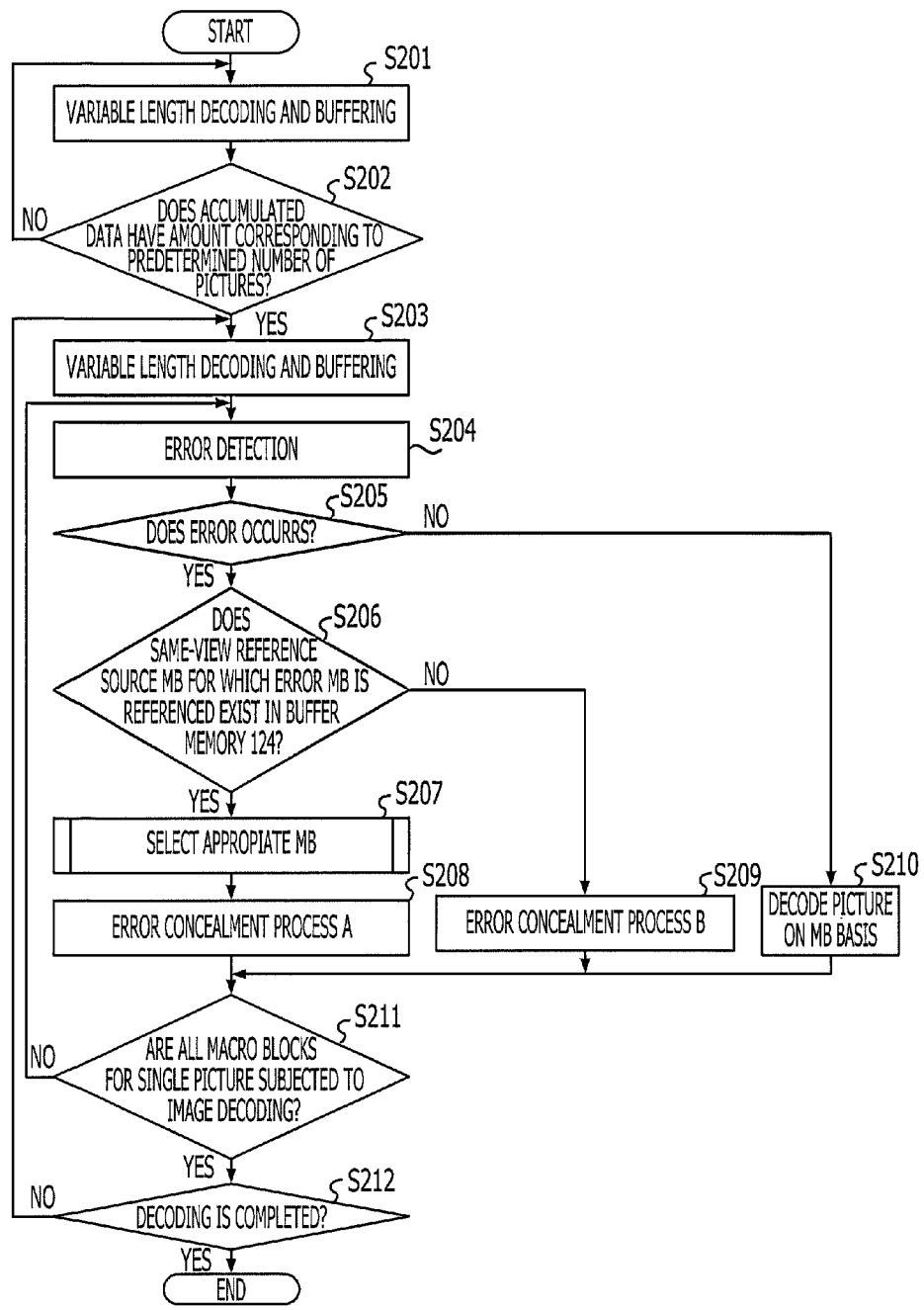
FIG. 10 is a flowchart of an example of a moving picture decoding process to be performed for a dependent side.

Next, the decoding process that is performed for the dependent side is described. FIG. 10 is a flowchart of an example of a moving picture decoding process for the dependent side.

In operation S201, the variable length decoder 122 performs the variable length decoding on coded data that expresses a single picture for the dependent side and has been divided by the receiving unit 101, before the image decoding to be performed by the image decoder 126. The variable length decoder 122 causes decoded data (such as motion vectors and coefficient information) obtained by the variable length decoding to be stored in the buffer memory 124. In addition, the variable length decoder 122 outputs, to the error detector 123, data (such as macro-block addresses) that is necessary for error detection.

In operation S202, the moving picture decoding device 100 determines whether or not decoded data that is accumulated in the buffer memory 124 has an amount corresponding to the predetermined number of pictures. When the decoded data that is accumulated in the buffer memory 104 has the amount corresponding to the predetermined number of pictures (Yes in operation S202), the process proceeds to operation S203. When the decoded data that is accumulated in the buffer memory 104 does not have the amount corresponding to the predetermined number of pictures (No in operation S202), the process returns to operation S201. Thus, the variable length decoder 122 may perform the variable length decoding on the predetermined number of pictures before the image decoding to be performed by the image decoder 126.

In operation S203, the variable length decoder 122 performs the variable length decoding on the predetermined number of the next pictures. The variable length decoder 122 causes decoded data (such as motion vectors and coefficient information) obtained by the variable length decoding to be stored in the buffer memory 124. In addition, the variable length decoder 122 outputs, to the error detector 123, data (such as macro-block addresses) that is necessary for error detection.

In operation S204, the error detector 123 detects, on a macro-block basis on the basis of the data received from the variable length decoder 122, an error region from pictures in order from a picture to be first decoded to a picture to be lastly decoded. The error decoder 123 may detect an error when the values of the macro-block addresses are not continuous, for example.

In operation S205, the error detector 123 determines whether or not an error exists in a macro-block to be detected. When an error exists in the macro-block to be detected (Yes in operation S205), the process proceeds to operation S206. When an error does not exist in the macro-block to be detected (No in operation S206), the process proceeds to operation S210.

In operation S206, the block extractor 108 determines whether or not a same-view reference source MB for which the error MB is referenced exists in the buffer memory 124 for the dependent side. The same-view reference source MB is a macro-block included in a picture for the dependent side and has a motion vector for which the error MB is referenced. When the same-view reference source MB exists in the buffer memory 124 (Yes in operation S206), the process proceeds to operation S207. When the same-view reference source MB does not exist in the buffer memory 124 (No in operation S206), the process proceeds to operation S209.

In operation S207, when a plurality of same-view reference source MBs exist in the buffer memory 124, the block extractor 108 selects an appropriate MB that is estimated to be similar to the error MB. This selection operation is described with reference to FIG. 11.

In operation S208, the concealing unit 127 uses, for an error concealment process (error concealment process A), the macro-block included in the decoded picture and estimated to be similar to the error MB using the motion vector decoded according to the variable length decoding before the image decoding. The concealing unit 127 uses, for the error concealment process, the macro-block included in the decoded picture for the dependent side that is the same view.

In operation S209, when a motion vector for which the error MB is referenced is not among motion vectors decoded according to the variable length decoding before the image decoding, the concealing unit 127 performs a known error concealment process (error concealment process B). In the known error concealment process, a macro-block that is referenced for a motion vector of a macro-block located near the error MB is used to conceal the error, or a macro-block that is included in a picture decoded immediately before decoding of a picture including the error MB and is located at the same position as the error MB is used to conceal the error, for example. In operation S209, any error concealment process may be performed as long as the concealing process is a known error concealment process in which the motion vectors obtained by the variable length decoding performed before the image decoding are not used.

In operation S210, the image decoder 126 decodes the picture on a macro-block basis as described above.

In operation S211, the moving picture decoding device 100 determines whether or not macro-blocks for a single picture are subjected to the image decoding process. When any of the macro-blocks for the single picture is not subjected to the image decoding process (No in operation S211), the process returns to operation S204 so that the error detection is performed on the next macro-block. When all the macro-blocks for the single picture are subjected to the image decoding process (Yes in operation S211), the process proceeds to operation S212.

The selector 129 arranges the macro-blocks decoded by the image decoder 126 or arranges (the macro-blocks decoded by the image decoder 126 and the macro-block subjected to the error concealment process by the concealing unit 127 on the basis of the macro-block addresses and the identification number of the picture. Then, the selector 129 causes the macro-blocks to be stored in the picture memory 130 on a picture basis.

In operation S212, the moving picture decoding device 100 determines whether or not all pictures that are included in the coded data are decoded. When all the pictures are decoded (Yes in operation S212), the moving picture decoding device 100 terminates the decoding process. When any of all the pictures is not decoded (No in operation S212), the process returns to operation S203 so that the decoding process is performed on the single picture.

Next, operations S108 and S110 illustrated in FIG. 9 and operation S207 illustrated in FIG. 10, which are each performed to select an appropriate macro-block, are described. The operations S108, S110 and S207 may be performed in the same manner. Thus, operation S108 is described with reference to FIG. 11 using an example.

Figure 11:
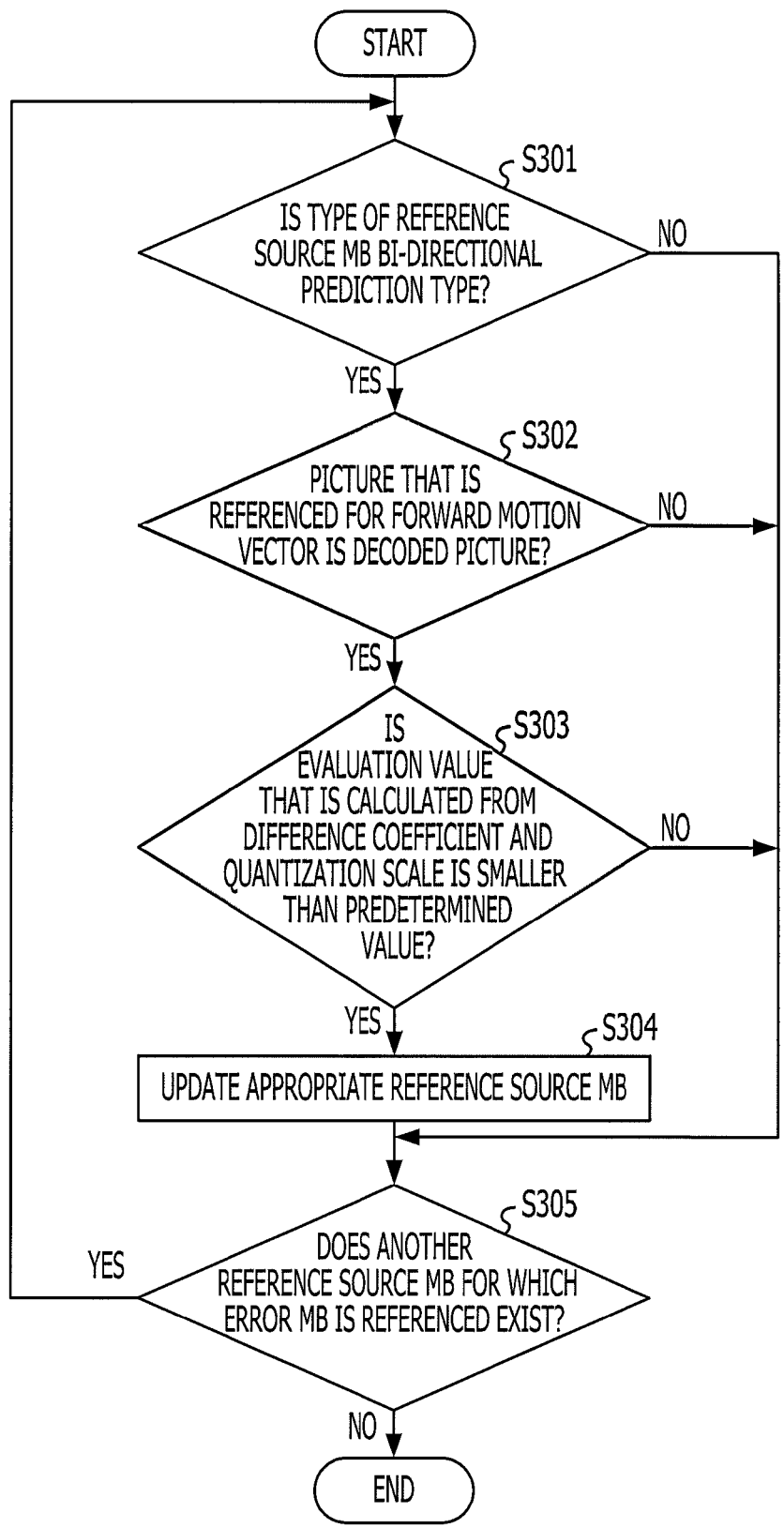
FIG. 11 is a flowchart of an example of a process of selecting an appropriate MB.

FIG. 11 is a flowchart of an example of the operation of selecting an appropriate MB. The example illustrated in FIG. 11 indicates that a plurality of reference source MBs exist. The example illustrated in FIG. 11 may apply to the case in which a plurality of same-view reference source MBs exist.

In operation S301, the block extractor 108 determines whether or not the type of a reference source MB is a bi-direction prediction type. When the type of the reference source MB is the bi-direction prediction type (Yes in operation S301), the process proceeds to operation S302. When the type of the reference source MB is not the bi-direction prediction type (No in operation S301), the process proceeds to operation S305.

In operation S302, the block extractor 108 determines whether or not a picture that is referenced for a forward motion vector (FMV) of the reference source MB is a decoded picture. When the picture is the decoded picture (Yes in operation S302), the process proceeds to operation S303. When the picture is not the decoded picture (No in operation S302), the process proceeds to operation S305. When the picture is to be decoded before decoding of a picture including the parallax MB, the block extractor 108 determines that the picture is the decoded picture, for example.

In operation S303, the block extractor 108 determines whether or not the evaluation value that is calculated on the basis of the difference coefficient (coefficient information) and the quantization scale is smaller than a predetermined value. The predetermined value is initially set to a sufficient large value. When the block extractor 108 determines that the evaluation value for the reference source MB to be evaluated is smaller than the predetermined value, the block extractor 108 updates the evaluation value so that the evaluation value is equal to the predetermined value. The evaluation value may be calculated according to the method according to the aforementioned second or third example. When the evaluation value is smaller than the predetermined value (Yes in operation S303), the process proceeds to operation S304. When the evaluation value is not smaller than the predetermined value (No in operation S303), the process proceeds to operation S305.

In operation S304, the block extractor 108 updates an appropriate reference source MB so that the macro-block evaluated using the evaluation value determined to be smaller than the predetermined value in operation S303 is set as the appropriate reference source MB.

In operation S305, the block extractor 108 determines whether or not another reference source MB for which the error MB is referenced exists. When the other reference source MB exists (Yes in operation S305), the process returns to operation S301. When the other reference source MB does not exist (No in operation S305), the operation of selecting an appropriate reference source MB is terminated. A reference source MB that is lastly updated in this process is the appropriate reference source MB. Thus, when a plurality of reference source MBs exist, an appropriate reference source MB may be selected. The appropriate reference source MB is an MB estimated to be similar to the error MB.

In the first embodiment, when a region (error region) in which an error occurs exists in a picture for the base side, a region that is included in a decoded picture for the dependent side and similar to the error region is estimated, and the region in which the error occurs may be concealed using data of the estimated region. This process may be achieved by performing the variable length decoding on data that has been coded according to the variable length coding and expresses several pictures before the image decoding of the data.

In the first embodiment, a parallax MB that is similar to an error MB for the base side and provided for the dependent side is extracted using parallax information for which the error MB for the base side is referenced. At this time, the parallax MB is yet to be decoded. Thus, the moving picture decoding device 100 specifies a reference source MB in the dependent side for which the parallax MB is referenced. Then, the moving picture decoding device 100 uses a motion vector of the specified reference source MB to extract, from a decoded picture, an MB that is to be referenced and similar to the parallax MB. Since the MB to be referenced is similar to the parallax MB and the parallax MB is similar to the error MB, the MB to be referenced is similar to the error MB. The moving picture decoding device 100 uses the MB (to be referenced) to perform the error concealment process on the error MB. Thus, in the moving picture decoding device 100, error resistance may be improved. From the perspective of the amount of generated coded data, an error occurs in a dependent image at a lower rate than a base image. When the MB to be referenced is extracted from the dependent image, the error resistance may be improved.

Coded data of a moving picture to be decoded is data coded according to the multi-view coding technique based on Moving Picture Expert Group (MPEG)-2, H.264 or the like. The parts that are included in the moving picture decoding device 100 illustrated in FIG. 3 may be circuits that are separated from each other. The moving picture decoding device 100 may be an integrated circuit that includes circuits that have the functions of the parts included in the moving picture decoding device 100. In addition, the parts that are included in the moving picture decoding device 100 may be functional modules that are achieved by a computer program that is executed on one or more processors included in the moving picture decoding device 100.

In the example illustrated in FIG. 3, the parts that are provided for the base side are separated from the parts that are provided for the dependent side. However, each of the pairs for the base and dependent sides may be a single unit, and each of the units may separately perform the process for the base side and perform the process for the dependent side. For example, the variable length decoders may be a single variable length decoder, and the single variable length decoder may perform the variable length decoding on the coded data for the base side and perform the variable length decoding on the coded data for the dependent side.

Next, a moving picture decoding device 100 according to a second embodiment is described. The second embodiment applies to the case in which parallax information for which an error MB is referenced cannot be acquired. One of the reasons that the parallax information for which the error MB is referenced cannot be acquired is that an error region is large and the parallax information is lost due to an error, for example. Another one of the reasons that the parallax information for which the error MB is referenced cannot be acquired may be that the parallax information for which the error MB is referenced does not exist. The moving picture decoding device 100 according to the second embodiment has the same configuration as the configuration illustrated in FIG. 3 except that the configuration of the block extractor 108 included in the moving picture decoding device 100 according to the second embodiment is different from the configuration of the block extractor 108 included in the moving picture decoding device 100 according to the first embodiment. The configuration of the block extractor 108 is described below.

It is considered that a parallax exist in a stereoscopic image and an image for the base side and an image for the dependent side are basically similar to each other. In the second embodiment, the error concealment process is performed using information of a macro-block located at the same position as an error MB and included in a picture for the dependent side.

Figure 12:
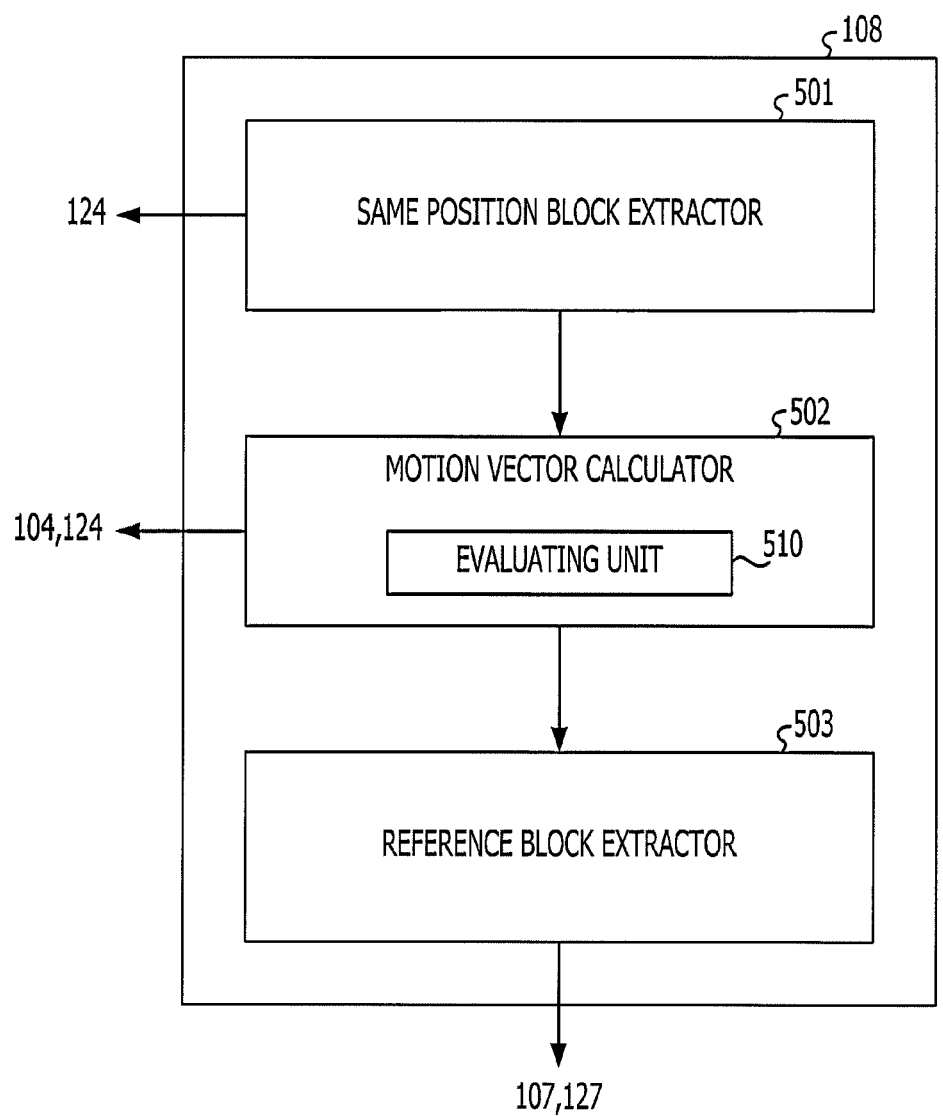
FIG. 12 is a block diagram illustrating an example of the configuration of a block extractor according to a second embodiment.

FIG. 12 is a block diagram illustrating an example of the configuration of the block extractor 108 according to the second embodiment. The block extractor 108 includes a same position block extractor 501, a motion vector calculator 502 and a reference block extractor 503. First, an error concealment process for the base side is described. An error concealment process for the dependent side is performed in the same manner as in the first embodiment.

The same position block extractor 501 specifies a picture that is provided for the dependent side and has been imaged at the same time as a picture that is provided for the base side and includes an error MB. Then, the same position block extractor 501 extracts a macro-block that is included in the picture for the dependent side and located at the same position as the error MB. The macro-block that is located at the same position as the error MB is hereinafter referred to as a same position MB. The same position block extractor 501 outputs information such as the macro-block address of the extracted same position MB to the motion vector calculator 502.

The motion vector calculator 502 calculates a concealment motion vector using a motion vector of the same position MB or a motion vector for which the same position MB is referenced. The calculation of the concealment motion vector is described later with reference to FIGS. 13 and 14 in detail. The motion vector calculator 502 outputs the calculated concealment motion vector to the reference block extractor 503.

The reference block extractor 503 extracts: the macro-block address of a macro-block (MB to be referenced) that is included in a decoded picture and to which the received concealment motion vector points; and the identification number of the picture including the macro-block. Then, the reference block extractor 503 outputs the extracted macro-block address and the extracted identification number to the concealing unit 107.

The concealing unit 107 performs the error concealment process using the macro-block referenced for the concealment motion vector.

Figure 13:
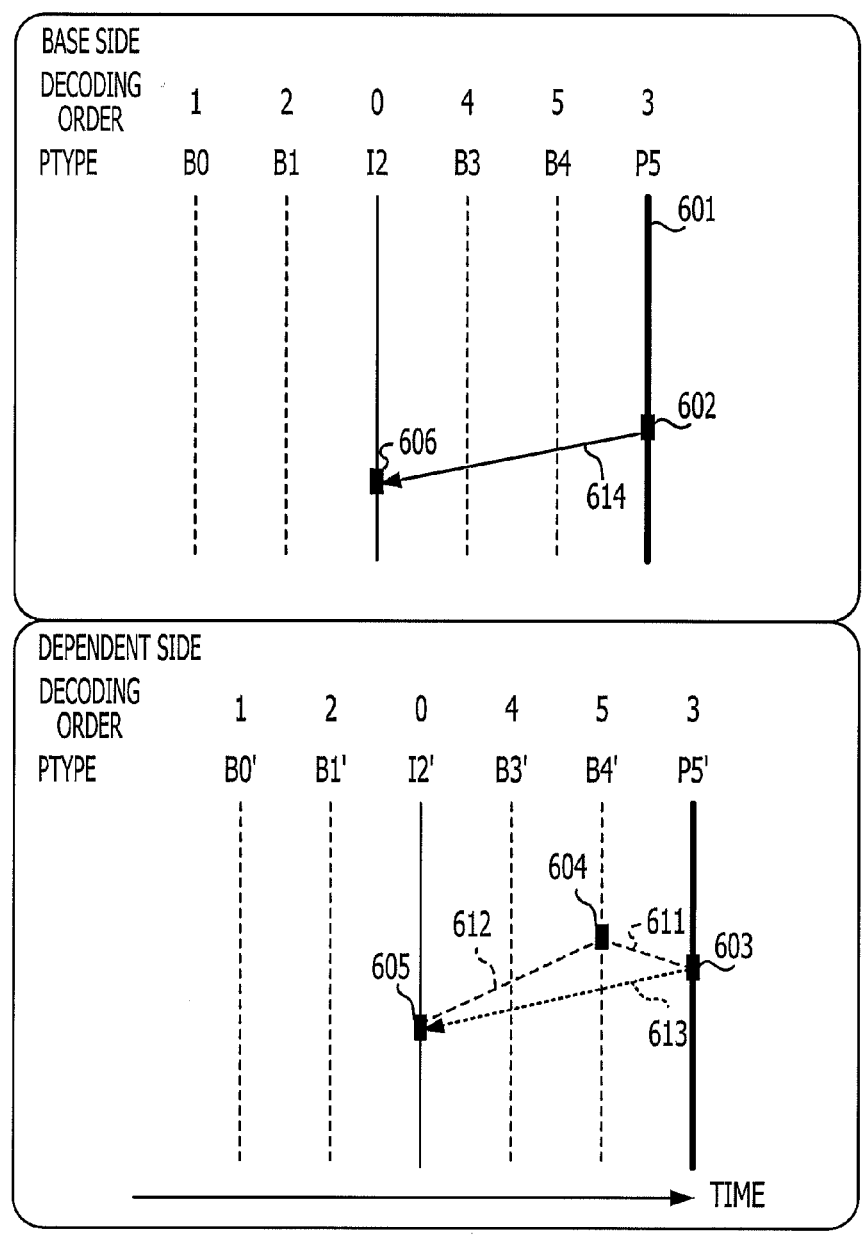
FIG. 13 is a diagram illustrating relationships among an error MB, a same position MB, a reference source MB and an MB to be referenced.

Next, relationships among an error MB, a same position MB, a reference source MB and an MB to be referenced are described, and a calculation of a concealment motion vector is described in detail. FIG. 13 is a diagram illustrating relationships among an error MB, a same position MB, a reference source MB and a MB to be referenced.

For example, when information of an MB 602 included in a picture P5 601 that is provided for the base side and to be decoded third among pictures for the base side is lost due to an error, a macro-block (same position MB) 603 that is located at the same position as the error MB 602 included in the picture P5 601 for the base side exists in a picture P5' that is provided for the dependent side and to be decoded third among pictures for the dependent side.

Since the picture P5' is decoded immediately after decoding of the picture P5 for the base side, a decoded image of the picture P5' does not exist when the picture P5 is decoded.

Pictures B for the dependent side are decoded according to the variable length decoding in advance. Thus, information of vectors 611 and 612 of a reference source MB 604 for which the same position MB 603 of the picture P5' is referenced exists in the buffer memory 124. The motion vector calculator 502 generates a temporary concealment motion vector (MVC') 613 using the information of the vectors 611 and 612 of the reference source MB 604.

In the example illustrated in FIG. 13, when the backward motion vector MVB' 611 of the reference source MB 604 included in a picture B4' points to the same position MB 603, the temporary concealment motion vector 613 is calculated according to the aforementioned Equation (1) using the forward motion vector FMV' 612 of the reference source MB 604.

The motion vector calculator 502 may treat the temporary concealment motion vector 613 as a concealment motion vector. In this case, a block 605 that is included in a picture I2' is an MB to be referenced. In addition, the temporary concealment motion vector 613 may be treated as a concealment motion vector 614, and the error MB 602 may be referenced for the concealment motion vector 614. In this case, a block 606 that is included in a picture I2 and to which the motion vector 614 points from the error MB is an MB to be referenced.

In the example illustrated in FIG. 13, parallax information is not used. Thus, the example illustrated in FIG. 13 may apply to the case in which parallax information is not used in the multi-view vide coding technique.

Figure 14:
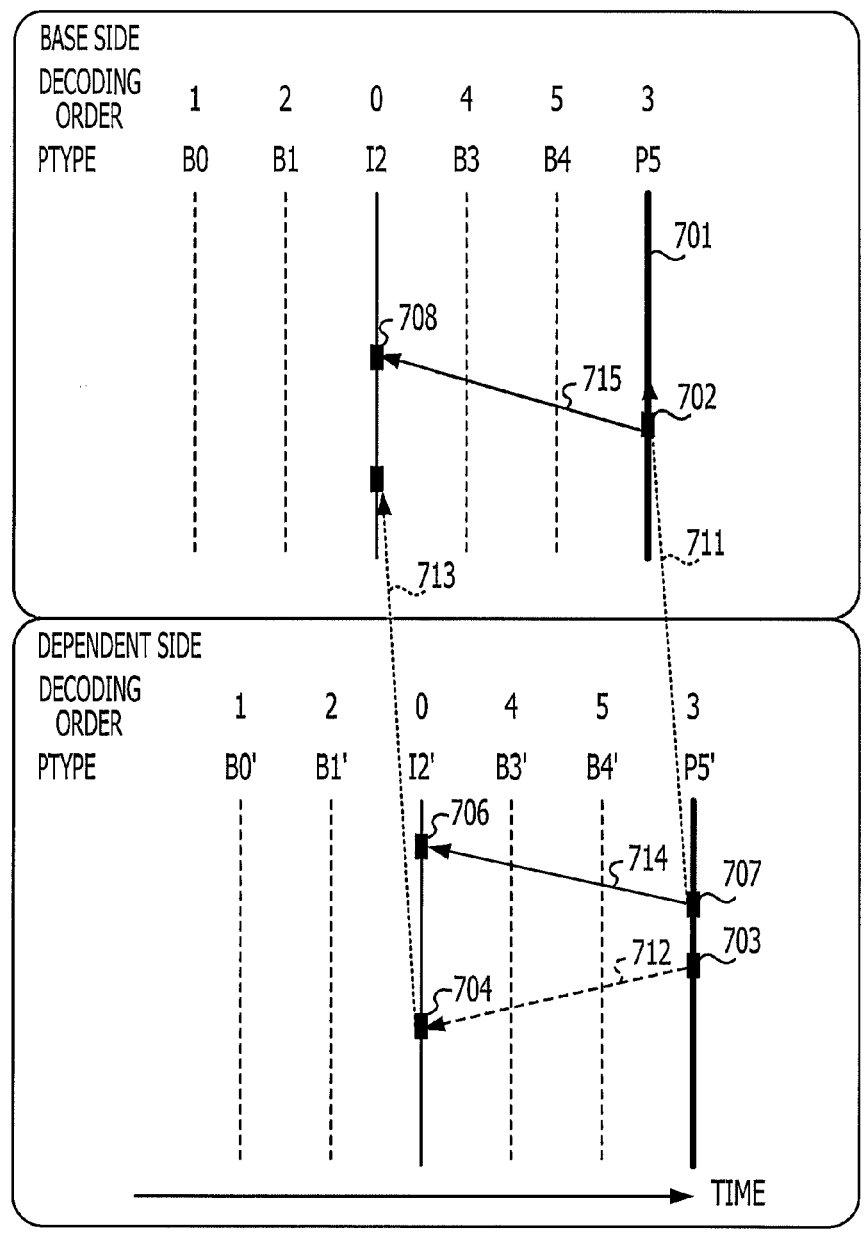
FIG. 14 is a diagram illustrating relationships among an error MB, a same position MB and an MB to be referenced.

FIG. 14 is a diagram illustrating relationships among an error MB, a same position MB and an MB to be referenced. For example, when information of an MB 702 included in a picture P5 701 that is provided for the base side and to be decoded third among pictures for the base side is lost due to an error, a macro-block (same position MB) 703 that is located at the same position as the error MB 702 of the picture P5 701 for the base side exists in a picture P5' that is provided for the dependent side and to be decoded third among pictures for the dependent side.

The picture P5' is decoded immediately after decoding of the picture P5 for the base side. Thus, a decoded image of the picture P5' does not exist when the picture P5 is decoded.

Pictures B for the dependent side are decoded according to the variable length decoding before in advance. A motion vector (MV0) 712 of the same position MB 703 included in the picture P5' exists in the buffer memory 124. It is assumed that a block 704 that is included in a picture I2' and referenced for the motion vector 712 has parallax information (MVD2) 713. The motion vector calculator 502 may treat the motion vector 712 as a concealment motion vector and treat the block 704 as an MB to be referenced.

In addition, the motion vector calculator 502 applies the parallax information 713 to the same position MB 703 and specifies a macro-block 707 that is shifted by an amount corresponding to the parallax information 713 from the same position MB 703. When the macro-block 707 has a motion vector 714 for which the picture I2' is referenced, the motion vector calculator 502 may treat the motion vector 714 as a concealment motion vector and treat a block 706 referenced for the motion vector 714 as an MB to be referenced.

In addition, the motion vector calculator 502 may apply, to the error MB 702, a motion vector 715 that is the same as the motion vector 714. The motion vector calculator 502 may treat the motion vector 715 as a concealment motion vector and treat a block 708 referenced for the motion vector 715 as an MB to be referenced.

The evaluating unit 510 performs the same process as described in the first embodiment so that one macro-block is selected when a plurality of macro-blocks to be evaluated exist.

In the second embodiment, even when parallax information for which an error MB is referenced cannot be acquired, the error concealment process may be performed on the error MB for the base side using a macro-block of a picture for the dependent side. In the second embodiment, even when data is coded according to the multi-view video coding in which parallax information is not used, the process illustrated in FIG. 13 may be used.

Figure 15:
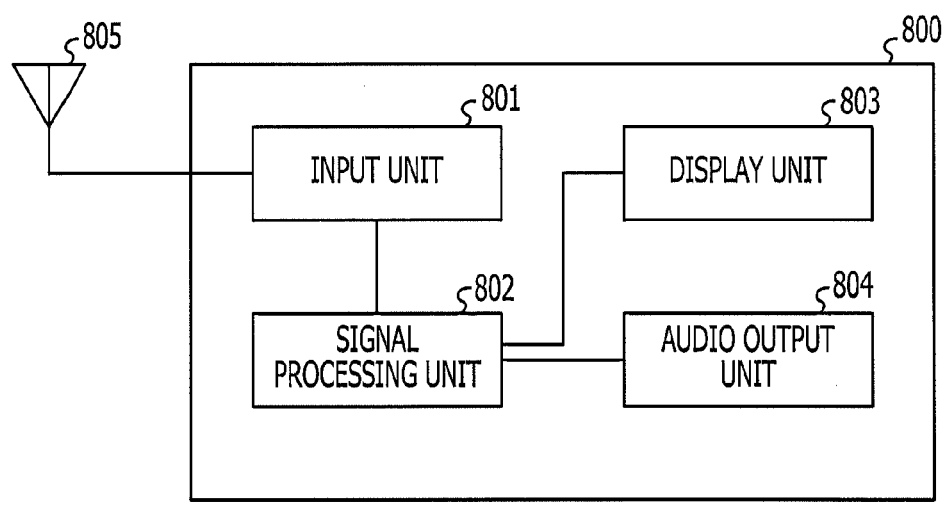
FIG. 15 is a block diagram illustrating an example of the configuration of a video reproducing device.

Next, a video reproducing device that is included in the moving picture decoding device 100 according to the first or second embodiment is described. FIG. 15 is a block diagram illustrating an example of the configuration of a video reproducing device 800. The video reproducing device 800 illustrated in FIG. 15 includes an input unit 801, a signal processing unit 802, a display unit 803 and an audio output unit 804.

The input unit 801 has a circuit that is connected to an antenna 805 and receives, through the antenna 805, a video signal carried by a wireless radio wave, for example. The input unit 801 performs analog-to-digital conversion on the received video signal. The input unit 801 demodulates the digitized video signal according to a demodulation method corresponding to a modulation method used for the carrier wave. The input unit 801 performs an error correction process, such as forward error correction, on the demodulated video signal. The input unit 801 outputs, to the signal processing unit 802, the video signal that has been demodulated and subjected to the error correction process.

The signal processing unit 802 has at least one processor and a circuit located near the processor. The signal processing unit 802 decodes coded data that expresses a moving picture and is included in the video signal. Also, the signal processing unit 802 decodes a coded audio signal included in the video signal. In this case, it is assumed that the coded data of the moving picture is data coded according to the multi-view video coding. The signal processing unit 802 outputs the decoded data of the moving picture to the display unit 803. The signal processing unit 802 outputs the decoded audio signal to the audio output unit 804.

The display unit 803 is a display device such as a liquid crystal display, for example. The display unit 803 displays the moving picture data received from the signal processing unit 802.

The audio output unit 804 is a speaker, for example. The audio output unit 804 outputs the audio signal received from the signal processing unit 802.

Figure 16:
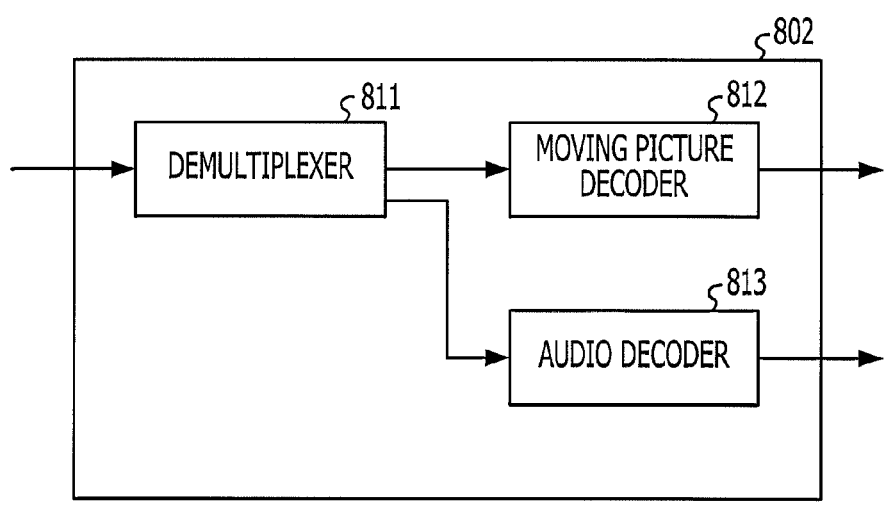
FIG. 16 is a block diagram illustrating an example of the configuration of a signal processing unit.

FIG. 16 is a block diagram illustrating an example of the configuration of the signal processing unit 802. The signal processing unit 802 illustrated in FIG. 16 includes a demultiplexer 811, a moving picture decoder 812 and an audio decoder 813.

The demultiplexer 811 divides the video signal into the coded data of the moving picture and the coded audio signal. The demultiplexer 811 outputs the coded data to the moving picture decoder 812 on a picture basis. The demultiplexer 811 outputs the coded audio signal to the audio decoder 813.

The moving picture decoder 812 may serve as the moving picture decoding device 100 described in the first or second embodiment. The moving picture decoder 812 decodes the coded moving picture data received from the demultiplexer 811. When an error occurs in any of pictures included in the coded data, the moving picture decoder 812 performs the concealment process to conceal a region in which the error occurs in the aforementioned manner. The moving picture decoder 812 outputs the decoded moving picture data to the display unit 803.

The audio decoder 813 decodes the coded audio signal received from the demultiplexer 811 using a decoding method corresponding to a coding method used for the coded audio signal. The coding method is MPEG-2 AAC, MPEG-4 AAC or the like.

In a third embodiment, the video reproducing device 800 has the moving picture decoding device described in the first or second embodiment. Thus, in the video reproducing device 800, error resistance may be improved, and a degradation (caused by a transmission error or the like) of the quality of an image may be suppressed.

Figure 17:
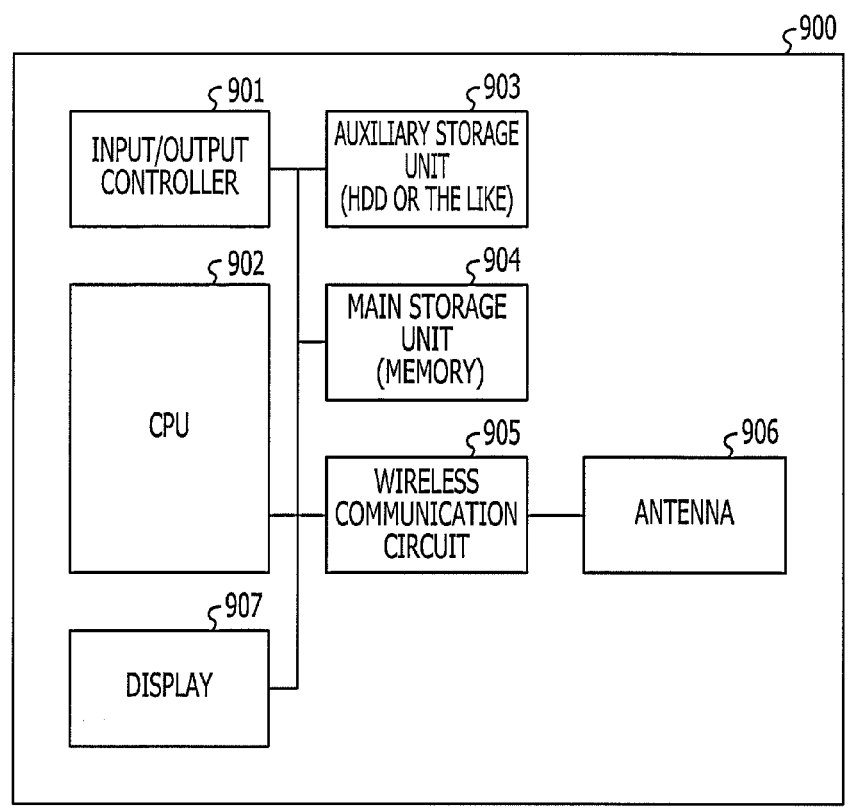
FIG. 17 is a block diagram illustrating an example of the configuration of a mobile terminal.

Next, a mobile terminal that has the processing functions of the moving picture decoding device 100 described in the first or second embodiment is described. FIG. 17 is a block diagram illustrating an example of the configuration of a mobile terminal 900. The mobile terminal 900 illustrated in FIG. 17 includes an input/output controller 901, a central processing unit (CPU) 902, an auxiliary storage unit 903, a main storage unit 904, a wireless communication circuit 905, an antenna 906 and a display 907.

The input/output controller 901 controls input from an input device (key input unit of the mobile terminal 900 or the like). The input/output controller 901 controls output to the display (monitor or the like) 907. The CPU 902 executes various programs. The CPU 902 is a so-called processor and controls the processes to be performed by the parts of the mobile terminal 900.

The auxiliary storage unit 903 and the main storage unit 904 store data that is necessary for the programs and execution of the programs. The auxiliary storage unit 903 has a moving picture decoding program that is used to perform the aforementioned processes to be performed by the moving picture decoding device 100. The wireless communication circuit 905 performs communication through the antenna 906 and a network. The antenna 906 transmits and receives a wireless signal and a video signal.

The CPU 902 receives the coded moving picture data received by the antenna 906 through the wireless communication circuit 905. The CPU 902 loads the aforementioned moving picture decoding program onto the main storage unit 904. The CPU 902 may perform the error concealment process (described in the first or second embodiments) by executing the loaded program.

In a fourth embodiment, the mobile terminal 900 performs the processes of the moving picture decoding device described in the first or second embodiments. Thus, in the mobile terminal 900, error resistance may be improved, and a degradation (caused by a transmission error or the like) of the quality of an image may be suppressed.

Even when an image that is provided for the base side and coded according to the multi-view video coding is decoded and reproduced as a two-dimensional video, error resistance may be improved by performing the error concealment process on an image that is provided for the dependent side and is not reproduced.

According to an aspect of the embodiments of the invention, any combinations of one or more of the described features, functions, operations, and/or benefits can be provided. A combination can be one or a plurality. The embodiments can be implemented as an apparatus (a machine) that includes hardware for performing the described features, functions, operations, and/or benefits, for example, hardware to execute instructions, for example, computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The moving picture decoding device 100, video reproducing device, mobile terminal device 900, can comprise a controller (CPU) (e.g., a hardware logic circuitry based computer processor that processes or executes instructions, namely software/program), computer readable media, transmission communication interface (network interface), and/or an output device, for example, a display device, and which can be in communication among each other through one or more data communication buses. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing and/or configuring one or more apparatuses and/or computer processors to execute the described operations. The results produced can be output to an output device, for example, displayed on the display. An apparatus or device refers to a physical machine, for example, a computer (physical computing hardware or machinery) that implement or execute instructions, for example, by way of software, which is code executed by computing hardware, and/or by way of computing hardware (e.g., in circuitry, etc.), to achieve the functions or operations being described. The functions of embodiments described can be implemented in any type of apparatus that can execute instructions or code. More particularly, programming or configuring or causing an apparatus or device, for example, a computer, to execute the described functions of embodiments of the invention creates a new machine where in case of a computer a general purpose computer in effect becomes a special purpose computer once it is programmed or configured or caused to perform particular functions of the embodiments of the invention pursuant to instructions from program software.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A moving picture decoding device comprising:
a processor; and
a memory which stores instructions, which when executed by the processor, cause the processor to execute:
receive data that has been coded according to multi-view coding and includes data obtained by coding, on a region basis, pictures that are included in a moving picture and provided for a plurality of views including a first view and a second view;
first decode, on a region basis, coded data that is included in the data coded according to the multi-view coding and provided for the first view, the data for the first view usable as a reference picture for the second view;
second decode, on a region basis, coded data that is included in the data coded according to the multi-view coding and provided for the second view;
detect a region that cannot be decoded for the first view as an error region of the first view;
for the detected region of the first view that cannot be decoded, extract, from the coded data for the second view, parallax information for a reference source region not yet decoded in the second view; and
when, according to the extracted parallax information, the reference source region not yet decoded in the second view has first and second motion vectors for which the error region of the first view is referenced, calculate a first concealment motion vector of the error region of the first view based upon the first and second motion vectors from the second view; and
conceal the error region of the first view using decoded data of a region for the second view according to the first concealment motion vector.

2. The device according to claim 1,
wherein before the first decoding of a first picture that includes the detected region of the first view that cannot be decoded, the second decoding decodes a second picture that corresponds to the first picture and is included in the coded data for the second view, and after the decoding of the second picture, the second decoding decodes a motion vector and parallax information from a plurality of pictures to be decoded after the decoding of the second picture before the first decoding of the first picture.

3. The device according to claim 1,
wherein when a plurality of reference source regions exist, the calculating selects a reference source region based upon evaluation values that are calculated from difference coefficients of the reference source regions and quantization scales of the reference source regions.

4. The device according to claim 1, the instructions cause the processor to further execute:
specify a region incapable of being decoded and is among regions included in a picture that is provided for the second view and has been imaged at same time as a picture that includes the specified region of the second view that cannot be decoded,
wherein the concealing treats a third motion vector of the specified region as a second concealment motion vector, and conceals the specified region using a region that is among regions of decoded pictures for the first view and referenced regions of the second view for the second concealment motion vector.

5. The device according to claim 1, wherein the instructions cause the processor to further execute:
specify a region incapable of being decoded and is among regions included in a picture that is provided for the second view and has been imaged at same time as a picture that includes the specified region of the second view that cannot be decoded; and
calculate a second concealment motion vector based upon a third motion vector and a fourth motion vector of the specified region of the second view, when a reference source region of decoded picture for the second view has the third motion vector and the fourth motion vector for which the specified region is referenced,
wherein the concealing conceals the specified region using a region that is among regions of decoded pictures for the first view and referenced regions of the second view for the second concealment motion vector.

6. A moving picture decoding method comprising:
receiving data that has been coded according to multi-view coding and includes data obtained by coding, on a region basis, pictures that are included in a moving picture and provided for a plurality of views including a first view and a second view;
first decoding, on a region basis, coded data that is included in the data coded according to the multi-view coding and provided for the first view, the data for the first view usable as a reference picture for the second view;
second decoding, on a region basis, coded data that is included in the data coded according to the multi-view coding and provided for the second view;
detecting a region that cannot be decoded for the first view as an error region of the first view;
for the detected region of the first view that cannot be decoded, extracting, from the coded data for the second view, parallax information for a reference source region not yet decoded in the second view; and
when, according to the extracted parallax information, the reference source region not yet decoded in the second view has first and second motion vectors for which the error region of the first view is referenced, calculating a first concealment motion vector of the error region of the first view based upon the first and second motion vectors from the second view; and
concealing the error region of the first view using decoded data of a region for the second view according to the first concealment motion vector.

7. The method according to claim 6,
wherein before the first decoding of a first picture that includes the detected region of the first view that cannot be decoded, the second decoding decodes a second picture that corresponds to the first picture and is included in the coded data for the second view, and after the decoding of the second picture, the second decoding decodes a motion vector and parallax information from a plurality of pictures to be decoded after the decoding of the second picture before the first decoding of the first picture.

8. The method according to claim 6,
wherein in the calculating, when a plurality of reference source regions exist, a reference source region is selected on the basis of evaluation values that are calculated from difference coefficients of the reference source regions and quantization scales of the reference source regions.

9. The method according to claim 6, further comprising
specifying a region incapable of being decoded and is among regions included in a picture that is provided for the second view and has been imaged at same time as a picture including the specified region of the second view that cannot be decoded,
wherein in the concealing, a third motion vector of the specified region is treated as a second concealment motion vector, and the specified region is concealed using a region that is among regions of decoded pictures for the first view and referenced regions of the second view for the second concealment motion vector.

10. The method according to claim 6, further comprising:
specifying a region as incapable of being decoded and is among regions included in a picture that is provided for the second view and has been imaged at same time as a picture including the specified region of the second view that cannot be decoded; and
calculating a second concealment motion vector based upon a third motion vector and a fourth motion vector of the specified region of the second view, when a reference source region of decoded picture for the second view has the third motion vector and the fourth motion vector for which the specified region is referenced,
wherein in the concealing, the specified region is concealed using a region that is among regions of decoded pictures for the first view and referenced regions of the second view for the second concealment motion vector.

11. An integrated circuit comprising:
computing hardware and a memory, to implement:
a receiving unit that receives data that has been coded according to multi-view coding and includes data obtained by coding, on a region basis, pictures that are included in a moving picture and provided for a plurality of views including a first view and a second view;
a first decoder that decodes, on a region basis, coded data that is included in the data coded according to the multi-view coding and provided for the first view, the data for the first view usable as a reference picture for the second view;
a second decoder that decodes, on a region basis, coded data that is included in the data coded according to the multi-view coding and provided for the second view;
a detector that detects a region that cannot be decoded for the first view as an error region of the first view;
an extractor that for the detected region of the first view that cannot be decoded, extracts, from the coded data for the second view, parallax information for a reference source region not yet decoded in the second view; and
a calculator that when, according to the extracted parallax information, the reference source region not yet decoded in the second view has first and second motion vectors for which the error region of the first view is referenced, calculate a first concealment motion vector of the error region of the first view based upon the first and second motion vectors from the second view; and
a concealing unit that conceals the error region of the first view using decoded data of a region for the second view according to the first concealment motion vector.

12. The integrated circuit according to claim 11,
wherein before the first decoder decodes a first picture that includes the detected region of the first view that cannot be decoded, the second decoder decodes a second picture that corresponds to the first picture and is included in the coded data for the second view, and after the decoding of the second picture, the second decoder decodes a motion vector and parallax information from a plurality of pictures to be decoded after the decoding of the second picture before the first decoding of the first picture.

* * * * *